United States Patent
Shoraku et al.

(10) Patent No.: US 8,334,954 B2
(45) Date of Patent: *Dec. 18, 2012

(54) LIQUID CRYSTAL DISPLAY DEVICE

(75) Inventors: Akihiro Shoraku, Suzuka (JP);
Toshihide Tsubata, Tsu (JP)

(73) Assignee: Sharp Kabushiki Kaisha, Osaka (JP)

(*) Notice: Subject to any disclaimer, the term of this patent is extended or adjusted under 35 U.S.C. 154(b) by 302 days.

This patent is subject to a terminal disclaimer.

(21) Appl. No.: 12/295,672

(22) PCT Filed: Apr. 4, 2007

(86) PCT No.: PCT/JP2007/057577
§ 371 (c)(1),
(2), (4) Date: Oct. 1, 2008

(87) PCT Pub. No.: WO2007/114471
PCT Pub. Date: Oct. 11, 2007

(65) Prior Publication Data
US 2009/0225246 A1 Sep. 10, 2009

(30) Foreign Application Priority Data
Apr. 4, 2006 (JP) .................. 2006-103222

(51) Int. Cl.
*G02F 1/1337* (2006.01)
*G02F 1/1343* (2006.01)
(52) U.S. Cl. .......................... 349/129; 349/39
(58) Field of Classification Search .......... 349/39, 349/129
See application file for complete search history.

(56) References Cited

U.S. PATENT DOCUMENTS

| 5,748,276 A | 5/1998 | Uno et al. |
| 6,067,140 A | 5/2000 | Woo et al. |

(Continued)

FOREIGN PATENT DOCUMENTS

JP 08-160454 6/1996

(Continued)

OTHER PUBLICATIONS

English translation International Preliminary Report on Patentability mailed Nov. 27, 2008 in corresponding PCT Application No. PCT/JP2007/057577.

(Continued)

*Primary Examiner* — Jerry Blevins
(74) *Attorney, Agent, or Firm* — Nixon & Vanderhye P.C.

(57) ABSTRACT

Each pixel region includes first, second, third and fourth liquid crystal domains that come to have first, second, third and fourth predetermined tilt directions, respectively, in response to a voltage applied. The first, second, third and fourth directions are defined such that an angle formed between any two of the four directions is approximately equal to an integral multiple of 90 degrees. The first, second, third and fourth liquid crystal domains are arranged in two columns and two rows so as to define a matrix pattern and to be adjacent to each other. An extended portion of a storage capacitor line defines at least a part of a central opaque portion that selectively shields at least a part of a boundary area, where each of the first, second, third and fourth liquid crystal domains contacts with another one of the liquid crystal domains, from incoming light. A contact hole has been cut through an insulating layer, where there is a contact portion between a drain extension line and a first electrode, and is located in a part of the central opaque portion that is closer to the liquid crystal layer.

6 Claims, 24 Drawing Sheets

U.S. PATENT DOCUMENTS

| | | | |
|---|---|---|---|
| 6,249,011 B1 | 6/2001 | Matsumoto | |
| 6,335,776 B1 | 1/2002 | Kim et al. | |
| 6,369,870 B1 | 4/2002 | Koma | |
| 6,411,346 B1* | 6/2002 | Numano et al. | 349/39 |
| 6,512,564 B1* | 1/2003 | Yoshida et al. | 349/124 |
| 6,567,144 B1 | 5/2003 | Kim et al. | |
| 6,867,836 B2 | 3/2005 | Stalder et al. | |
| 6,919,942 B2 | 7/2005 | Aoki et al. | |
| 6,930,739 B2 | 8/2005 | Takeda et al. | |
| 6,937,311 B2 | 8/2005 | Song et al. | |
| 6,958,791 B2 | 10/2005 | Shimoshikiryo | |
| 7,379,143 B2 | 5/2008 | Lyu | |
| 2003/0071952 A1 | 4/2003 | Yoshida et al. | |
| 2003/0178628 A1 | 9/2003 | Aoki et al. | |
| 2003/0193625 A1* | 10/2003 | Yoshida et al. | 349/43 |
| 2003/0227429 A1* | 12/2003 | Shimoshikiryo | 345/90 |
| 2004/0001167 A1 | 1/2004 | Takeuchi et al. | |
| 2004/0222419 A1* | 11/2004 | Matsui et al. | 257/59 |
| 2005/0052590 A1 | 3/2005 | Ochiai et al. | |
| 2005/0128397 A1 | 6/2005 | Sasaki et al. | |
| 2005/0200766 A1 | 9/2005 | Chen | |
| 2005/0237455 A1 | 10/2005 | Fujioka et al. | |
| 2005/0253797 A1 | 11/2005 | Kamada et al. | |
| 2006/0007194 A1 | 1/2006 | Verschueren et al. | |
| 2006/0028589 A1 | 2/2006 | Um et al. | |
| 2006/0038948 A1 | 2/2006 | Nishikawa et al. | |
| 2006/0050208 A1 | 3/2006 | Enomoto et al. | |
| 2006/0103803 A1* | 5/2006 | Jeon et al. | 349/155 |
| 2006/0146234 A1 | 7/2006 | Bear et al. | |
| 2006/0146243 A1 | 7/2006 | Nakanishi et al. | |
| 2008/0122772 A1 | 5/2008 | Takeuchi et al. | |
| 2009/0079923 A1 | 3/2009 | Miyachi | |
| 2009/0086141 A1 | 4/2009 | Shoraku et al. | |
| 2009/0225246 A1 | 9/2009 | Shoraku et al. | |
| 2009/0244462 A1 | 10/2009 | Tsubata | |
| 2009/0279034 A1 | 11/2009 | Shoraku et al. | |
| 2009/0284703 A1 | 11/2009 | Shoraku et al. | |

FOREIGN PATENT DOCUMENTS

| | | |
|---|---|---|
| JP | 08-179341 | 7/1996 |
| JP | 09-281497 | 10/1997 |
| JP | 10-161102 | 6/1998 |
| JP | 11-084421 | 3/1999 |
| JP | 11-352486 | 12/1999 |
| JP | 2003-107526 | 4/2003 |
| JP | 2004-062146 | 2/2004 |
| JP | 2005-024926 | 1/2005 |
| WO | 2006/121220 | 11/2006 |

OTHER PUBLICATIONS

International Search Report for PCT/JP2007/057577, mailed May 15, 2007.
Notice of Allowance dated Mar. 31, 2011 from U.S. Appl. No. 11/916,604, filed May 20, 2009; Shoraku et al.
U.S. Appl. No. 12/297,931, filed Oct. 21, 2008; Shoraku et al.
English Translation of the International Preliminary Report on Patentability mailed Nov. 27, 2008 in corresponding PCT Application No. PCT/JP2007/058881, mailed May 15, 2007.
International Search Report for PCT/JP2007/058881, mailed Jun. 5, 2007.
Supplementary European Search Report mailed Mar. 8, 2010 in corresponding EP application 07742316.8.
U.S. Office Action mailed Aug. 27, 2010 in co-pending U.S. Appl. No. 12/297,931.
Notice of Allowance dated Aug. 5, 2011 from U.S. Appl. No. 12/297,931; Shoraku et al.
Office Action dated Jan. 30, 20.12 from U.S. Appl. No. 12/373,593; Tsubata.
U.S. Office Action mailed Jun. 1, 2012 in U.S. Appl. No. 13/067,836.
International Search Report for PCT/JP2007/063315 mailed Aug. 7, 2007.
English Translation of the International Preliminary Report on Patentability mailed Jan. 29, 2009 in PCT Application No. for PCT/JP2007/063315.
Supplementary EP Search Report mailed Jun. 7, 2010 in EP application 07768089.0.
Office Action mailed Jun. 22, 2011 in U.S. Appl. No. 12/517,626.
Notice of Allowance mailed Mar. 30, 2012 in U.S. Appl. No. 12/517,626.
Office Action mailed Oct. 13, 2011 in U.S. Appl. No. 12/517,626.
International Search Report for PCT/JP2007/073342 mailed Mar. 4, 2008.
English translation of the International Preliminary Report on Patentability mailed Jun. 18, 2009 in corresponding PCT Application No. PCT/JP2007/073342.
Supplementary EP Search Report mailed May 27, 2010 in corresponding EP application 07832962.0.
English translation of the International Preliminary Report on Patentability mailed Dec. 27, 2007 in corresponding PCT Application No. PCT/JP/2006/311640.

\* cited by examiner

LIQUID CRYSTAL DISPLAY DEVICE

This application is the U.S. national phase of International Application No. PCT/JP2007/057577 filed 4 Apr. 2007 which designated the U.S. and claims priority to JP 2006-103222 filed 4 Apr. 2006, the entire contents of each of which are hereby incorporated by reference.

TECHNICAL FIELD

The present invention relates to a liquid crystal display device and more particularly relates to a liquid crystal display device with a wide viewing angle characteristic.

BACKGROUND ART

Recently, the display performances of liquid crystal displays (LCDs) have been improved to the point that more and more manufacturers adopt LCD panels as TV monitors, for example. The viewing angle characteristic of LCDs has been improved to a certain degree but not satisfactorily in some respects. Among other things, there is still a high demand for improvement of the viewing angle characteristic of an LCD using a vertical alignment liquid crystal layer (which is sometimes called a "VA mode LCD").

A VA mode LCD, which is currently used for a TV set with a big screen, for example, adopts a multi-domain structure, in which multiple liquid crystal domains are formed in a single pixel region, to improve the viewing angle characteristic. An MVA mode is often adopted as a method of forming such a multi-domain structure. Specifically, according to the MVA mode, an alignment control structure is provided on one of the two substrates, which face each other with a vertical alignment liquid crystal layer interposed between them, so as to contact with the liquid crystal layer, thereby forming multiple domains with mutually different alignment directions (i.e., tilt directions), the number of which is typically four. As the alignment control structure, a slit (as an opening) or a rib (as a projection structure) may be provided for an electrode, thereby creating an anchoring force from both sides of the liquid crystal layer.

If a slit or a rib is adopted, however, the anchoring force will be applied onto liquid crystal molecules non-uniformly within a pixel region because the slit or rib has a linear structure unlike the situation where the pretilt directions are defined by an alignment film in a conventional TN mode LCD. As a result, the response speed may have a distribution unintentionally. In addition, since the transmittance of light will decrease in the areas with the slits or ribs, the luminance on the screen will decrease, too.

Patent Document No. 1: Japanese Patent Application Laid-Open Publication No. 11-133429
Patent Document No. 2: Japanese Patent Application Laid-Open Publication No. 11-352486

DISCLOSURE OF INVENTION

Problems to be Solved by the Invention

To avoid such a problem, the multi-domain structure is preferably formed by defining the pretilt directions with an alignment film for a VA mode LCD, too. Thus, the present inventors discovered and confirmed via experiments that a unique misalignment occurred in a VA mode LCD and affected its display quality.

Even in a conventional LCD in which the multi-domain structure is formed using an alignment film, a technique for providing an opaque portion for cutting the light that has been transmitted through an area with misalignment to minimize the deterioration in display quality due to the misalignment is also known (see Patent Document No. 1, for example).

The conventional multi-domain structure is provided with such an opaque portion to shield an area with an optical transmittance that is higher than a predetermined value (i.e., an area that looks brighter when viewed straight than an area where liquid crystal molecules are aligned normally) due to a misalignment such as a reverse tilt in a TN mode LCD, for example. However, the present inventors discovered that the display quality of a VA mode LCD could not be improved sufficiently just by shielding such an area that looked brighter when viewed straight than an area where liquid crystal molecules were aligned normally.

In order to overcome the problems described above, the present invention has an object of providing a VA mode liquid crystal display device with excellent display quality.

Means for Solving the Problems

A liquid crystal display device according to the present invention includes: a vertical alignment liquid crystal layer; a first substrate and a second substrate, which face each other with the liquid crystal layer interposed between them; a first electrode, which is arranged on the first substrate so as to face the liquid crystal layer; a second electrode, which is arranged on the second substrate so as to face the liquid crystal layer; and at least one alignment film, which is arranged in contact with the liquid crystal layer. A pixel region includes first, second, third and fourth liquid crystal domains in which liquid crystal molecules are tilted in first, second, third and fourth directions, respectively, around the center of a plane, and approximately at the middle of the thickness, of the liquid crystal layer in response to a voltage applied between the first and second electrodes. The first, second, third and fourth directions are predetermined directions that are defined such that an angle formed between any two of the four directions is approximately equal to an integral multiple of 90 degrees. The first, second, third and fourth liquid crystal domains are arranged in two columns and two rows so as to define a matrix pattern and to be adjacent to each other. The first substrate further includes a TFT, a gate bus line, a source bus line, a drain extension line, a storage capacitor line, and an insulating layer that is arranged between the drain extension line and the first electrode. An extended portion of the storage capacitor line defines at least a part of a central opaque portion that selectively shields a boundary area, where each of the first, second, third and fourth liquid crystal domains contacts with another one of the liquid crystal domains, from incoming light. A contact hole has been cut through the insulating layer, where there is a contact portion between the drain extension line and the first electrode, and is located in a part of the central opaque portion that is closer to the liquid crystal layer.

In one preferred embodiment, the extended portion of the storage capacitor line and an extended portion of the drain extension line include at least two rectangular portions that overlap with each other and that run in mutually different directions. The central opaque portion includes at least two rectangular portions that run in mutually different directions. The contact hole is arranged where these two sets of rectangular portions intersect with each other and is located closer to the liquid crystal layer.

In another preferred embodiment, the extended portion of the storage capacitor line and an extended portion of the drive extension line include only rectangular portions that overlap with each other and that run in a column direction. The central opaque portion includes a rectangular portion that runs in the column direction. The contact hole is arranged in a part of the rectangular portions that run in the column direction so as to be located closer to the liquid crystal layer.

In still another preferred embodiment, the contact portion is located at the center of a cross boundary area, which is defined by the first, second, third and fourth liquid crystal domains that are arranged in two columns and two rows so as to define a matrix pattern.

In yet another preferred embodiment, a gate insulating layer and a semiconductor layer are arranged on a part of the extended portion of the storage capacitor line, which defines the central opaque portion, so as to be located closer to the liquid crystal layer, and the contact portion is located in a part of the semiconductor layer closer to the liquid crystal layer.

In yet another preferred embodiment, the pixel region includes two subpixel regions, in which mutually different voltages are applied to the liquid crystal layer with respect to a signal voltage that has been supplied from the source bus line by way of their associated TFTs. Each of the two subpixel regions includes the first, second, third and fourth liquid crystal domains and the central opaque portion. The first electrode, the TFT, the drain electrode extension line and the storage capacitor line are provided for each of the two subpixel regions, and a storage capacitor, including an extended portion of the drain electrode extension line, an extended portion of the storage capacitor line, and an insulating layer and a semiconductor layer located between these two extended portions, is also provided for each said subpixel region. The semiconductor layer of the storage capacitor is the same as the semiconductor layer of the TFT.

In yet another preferred embodiment, in the pixel region, the areas of the first, second, third and fourth liquid crystal domains are substantially equal to each other.

Another liquid crystal display device according to the present invention is characterized by including: a vertical alignment liquid crystal layer; a first substrate and a second substrate, which face each other with the liquid crystal layer interposed between them; a first electrode, which is arranged on the first substrate so as to face the liquid crystal layer; a second electrode, which is arranged on the second substrate so as to face the liquid crystal layer; and at least one alignment film, which is arranged in contact with the liquid crystal layer. A pixel region includes at least one liquid crystal domain that produces a dark area, which looks darker than a gray scale tone being presented for a viewer located in front of the device, inside of, and substantially parallel to, an edge portion of the first electrode. Either the first substrate or the second substrate has an opaque member that includes at least one opaque portion for selectively shielding the dark area from incoming light.

Another liquid crystal display device according to the present invention is characterized by including: a vertical alignment liquid crystal layer; a first substrate and a second substrate, which face each other with the liquid crystal layer interposed between them; a first electrode, which is arranged on the first substrate so as to face the liquid crystal layer; a second electrode, which is arranged on the second substrate so as to face the liquid crystal layer; and at least one alignment film, which is arranged in contact with the liquid crystal layer. A pixel region includes a first liquid crystal domain in which liquid crystal molecules are tilted in a predetermined first direction around the center of a plane, and approximately at the middle of the thickness, of the liquid crystal layer in response to a voltage applied. The first liquid crystal domain is located close to at least a part of an edge of the first electrode. The part includes a first edge portion in which an azimuthal direction that is perpendicular to the part and that points toward the inside of the first electrode defines an angle greater than 90 degrees with respect to the first direction. Either the first substrate or the second substrate has an opaque member that includes a first opaque portion for selectively shielding the first edge portion from incoming light.

In one preferred embodiment, the pixel region further includes second, third and fourth liquid crystal domains in which liquid crystal molecules are tilted in second, third and fourth directions, respectively, around the center of the plane, and approximately at the middle of the thickness, of the liquid crystal layer in response to the voltage applied. The first, second, third and fourth directions are defined such that an angle formed between any two of the four directions is approximately equal to an integral multiple of 90 degrees. The second liquid crystal domain is located close to at least a part of another edge of the first electrode, and the part includes a second edge portion in which an azimuthal direction that is perpendicular to the part and that points toward the inside of the first electrode defines an angle greater than 90 degrees with respect to the second direction. The third liquid crystal domain is located close to at least a part of still another edge of the first electrode, and the part includes a third edge portion in which an azimuthal direction that is perpendicular to the part and that points toward the inside of the first electrode defines an angle greater than 90 degrees with respect to the third direction. The fourth liquid crystal domain is located close to at least a part of yet another edge of the first electrode, and the part includes a fourth edge portion in which an azimuthal direction that is perpendicular to the part and that points toward the inside of the first electrode defines an angle greater than 90 degrees with respect to the fourth direction. The opaque member further includes second, third and fourth opaque portions for selectively shielding the second, third and fourth edge portions, respectively, from incoming light.

In this particular preferred embodiment, the first, second, third and fourth liquid crystal domains are arranged such that the tilt directions of any two adjacent ones of the liquid crystal domains define an angle of approximately 90 degrees between them.

In a specific preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. The first and third edge portions are parallel to a vertical direction and the second and fourth edge portions are parallel to the horizontal direction.

In an alternative preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. The first and third edge portions are parallel to the horizontal direction and the second and fourth edge portions are parallel to a vertical direction.

In another alternative preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. Each of the first, second, third and fourth edge portions includes a first part that is parallel to the horizontal direction and a second part that is parallel to a vertical direction.

In another preferred embodiment, the pixel region further includes second, third and fourth liquid crystal domains in which liquid crystal molecules are tilted in second, third and fourth directions, respectively, around the center of the plane, and approximately at the middle of the thickness, of the liquid crystal layer in response to the voltage applied. The first, second, third and fourth directions are defined such that an angle formed between any two of the four directions is approximately equal to an integral multiple of 90 degrees. The first and second directions form an angle of approximately 180 degrees between them. The second liquid crystal domain is located close to at least a part of another edge of the first electrode, and the part includes a second edge portion in which an azimuthal direction that is perpendicular to the part and that points toward the inside of the first electrode defines an angle greater than 90 degrees with respect to the second direction. Each of the first and second edge portions includes a first part that is parallel to the horizontal direction and a second part that is parallel to a vertical direction. And the opaque member further includes a second opaque portion for selectively shielding at least a part of the second edge portion from incoming light.

In a specific preferred embodiment, if the horizontal direction on the display screen has an azimuthal angle of zero degrees, the first direction is either an approximately 135 degree direction or an approximately 225 degree direction.

In another preferred embodiment, if the horizontal direction of a display screen has an azimuthal angle of zero degrees, the first, second, third and fourth directions are an approximately 90 degree direction, an approximately 180 degree direction, an approximately 0 degree direction and an approximately 270 degree direction, respectively. The first and fourth edge portions are parallel to the horizontal direction and the second and third edge portions are parallel to a vertical direction.

In still another preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. The first, second, third and fourth edge portions are all parallel to a vertical direction.

In yet another preferred embodiment, the opaque member includes a central opaque portion for selectively shielding at least a portion of a boundary area of each of the first, second, third and fourth liquid crystal domains, which is adjacent to another one of the liquid crystal domains, from incoming light.

In yet another preferred embodiment, the opaque member includes another opaque portion for shielding an intersection between a boundary area of each of the first, second, third and fourth liquid crystal domains, which is adjacent to another one of the liquid crystal domains, and one of the first, second, third and fourth edge portions from incoming light.

In yet another preferred embodiment, the first substrate further includes a TFT, a gate bus line, a source bus line, a drain extension line, and a storage capacitor line. One of the first, second, third, fourth, central and another opaque portions is defined by at least a portion of at least one line selected from the group consisting of the gate bus line, the source bus line, the drain extension line, and the storage capacitor line.

In this particular preferred embodiment, the at least one line has a portion that is bent or broadened in a direction that crosses its length direction, and the at least the portion of the at least one line includes at least a part of the bent or broadened portion.

In yet another preferred embodiment, the second substrate further includes a black matrix layer, and one of the first, second, third, fourth, central and another opaque portions is defined by a portion of the black matrix layer.

In yet another preferred embodiment, the liquid crystal display device further includes two polarizers, which are arranged so as to face each other with the liquid crystal layer interposed between them and to have their transmission axes crossed at right angles. The first, second, third and fourth directions define an angle of approximately 45 degrees with respect to the transmission axes of the two polarizers.

In yet another preferred embodiment, the vertical alignment liquid crystal layer includes a liquid crystal material with negative dielectric anisotropy. The at least one alignment film includes two alignment films that are arranged so as to sandwich the liquid crystal layer between them. Respective pretilt directions defined by the two alignment films are different from each other by approximately 90 degrees.

In yet another preferred embodiment, the at least one alignment film includes two alignment films that are arranged so as to sandwich the liquid crystal layer between them. Respective pretilt angles defined by the two alignment films are substantially equal to each other.

In yet another preferred embodiment, the at least one alignment film is an optical alignment film.

Still another liquid crystal display device according to the present invention includes: a vertical alignment liquid crystal layer; a first substrate and a second substrate, which face each other with the liquid crystal layer interposed between them; a first electrode, which is arranged on the first substrate so as to face the liquid crystal layer; a second electrode, which is arranged on the second substrate so as to face the liquid crystal layer; and at least one alignment film, which is arranged in contact with the liquid crystal layer. A pixel region includes first, second, third and fourth liquid crystal domains in which liquid crystal molecules are tilted in first, second, third and fourth directions, respectively, around the center of a plane, and approximately at the middle of the thickness, of the liquid crystal layer in response to a voltage applied. The first, second, third and fourth directions are defined such that an angle formed between any two of the four directions is approximately equal to an integral multiple of 90 degrees. Each of the first, second, third and fourth liquid crystal domains is adjacent to another one of the liquid crystal domains. An opaque member includes a central opaque portion for selectively shielding at least a portion of a boundary area of each of the first, second, third and fourth liquid crystal domains, which is adjacent to another one of the liquid crystal domains, from incoming light.

In one preferred embodiment, the first liquid crystal domain is located close to at least a part of an edge of the first electrode, and the part includes a first edge portion in which an azimuthal direction that is perpendicular to the part and that points toward the inside of the first electrode defines an angle greater than 90 degrees with respect to the first direction. The second liquid crystal domain is located close to at least a part of another edge of the first electrode, and the part includes a second edge portion in which an azimuthal direction that is perpendicular to the part and that points toward the inside of the first electrode defines an angle greater than 90 degrees with respect to the second direction. The third liquid crystal domain is located close to at least a part of still another edge of the first electrode, and the part includes a third edge portion in which an azimuthal direction that is perpendicular to the part and that points toward the inside of the first electrode defines an angle greater than 90 degrees with respect to the third direction. The fourth liquid crystal domain is located close to at least a part of yet another edge of the first electrode, and the part includes a fourth edge portion in which an azimuthal direction that is perpendicular to the part and that points toward the inside of the first electrode defines an angle greater than 90 degrees with respect to the fourth direction.

In another preferred embodiment, the first, second, third and fourth liquid crystal domains are arranged in two rows and two columns so as to define a matrix pattern.

In an alternative preferred embodiment, the first, second, third and fourth liquid crystal domains are arranged in line in a predetermined direction.

In still another preferred embodiment, the first substrate further includes a TFT, a gate bus line, a source bus line, a drain extension line, and a storage capacitor line, and the central opaque portion is defined by at least a portion of at least one line selected from the group consisting of the gate bus line, the source bus line, the drain extension line, and the storage capacitor line.

In this particular preferred embodiment, the at least one line has a portion that is bent or broadened in a direction that crosses its length direction, and the at least the portion of the at least one line includes at least a part of the bent or broadened portion.

In yet another preferred embodiment, the second substrate further includes a black matrix layer, and the central opaque portion is defined by a portion of the black matrix layer.

In yet another preferred embodiment, the liquid crystal display device further includes two polarizers, which are arranged so as to face each other with the liquid crystal layer interposed between them and to have their transmission axes crossed at right angles. The first, second, third and fourth directions define an angle of approximately 45 degrees with respect to the transmission axes of the two polarizers.

In yet another preferred embodiment, the vertical alignment liquid crystal layer includes a liquid crystal material with negative dielectric anisotropy. The at least one alignment film includes two alignment films that are arranged so as to sandwich the liquid crystal layer between them. Respective pretilt directions defined by the two alignment films are different from each other by approximately 90 degrees.

In yet another preferred embodiment, the at least one alignment film includes two alignment films that are arranged so as to sandwich the liquid crystal layer between them, and respective pretilt angles defined by the two alignment films are substantially equal to each other.

In yet another preferred embodiment, the at least one alignment film is an optical alignment film.

Yet another liquid crystal display device according to the present invention includes: a vertical alignment liquid crystal layer; a first substrate and a second substrate, which face each other with the liquid crystal layer interposed between them; a first electrode, which is arranged on the first substrate so as to face the liquid crystal layer; a second electrode, which is arranged on the second substrate so as to face the liquid crystal layer; and at least one alignment film, which is arranged in contact with the liquid crystal layer. A pixel region includes first, second, third and fourth liquid crystal domains in which liquid crystal molecules are tilted in first, second, third and fourth directions, respectively, around the center of a plane, and approximately at the middle of the thickness, of the liquid crystal layer in response to a voltage applied. The first, second, third and fourth directions are defined such that an angle formed between any two of the four directions is approximately equal to an integral multiple of 90 degrees. The first liquid crystal domain is located close to at least a part of an edge of the first electrode, and the part includes a first edge portion in which an azimuthal direction that is perpendicular to the part and that points toward the inside of the first electrode defines an angle greater than 90 degrees with respect to the first direction. The second liquid crystal domain is located close to at least a part of another edge of the first electrode, and the part includes a second edge portion in which an azimuthal direction that is perpendicular to the part and that points toward the inside of the first electrode defines an angle greater than 90 degrees with respect to the second direction. The third liquid crystal domain is located close to at least a part of still another edge of the first electrode, and the part includes a third edge portion in which an azimuthal direction that is perpendicular to the part and that points toward the inside of the first electrode defines an angle greater than 90 degrees with respect to the third direction. The fourth liquid crystal domain is located close to at least a part of yet another edge of the first electrode, and the part includes a fourth edge portion in which an azimuthal direction that is perpendicular to the part and that points toward the inside of the first electrode defines an angle greater than 90 degrees with respect to the fourth direction. Each of the first, second, third and fourth liquid crystal domains is adjacent to another one of the liquid crystal domains. Either the first substrate or the second substrate includes an opaque member, which includes an opaque portion for shielding an intersection between a boundary area of each of the first, second, third and fourth liquid crystal domains, which is adjacent to another one of the liquid crystal domains, and one of the first, second, third and fourth edge portions from incoming light.

In one preferred embodiment, the first, second, third and fourth liquid crystal domains are arranged such that the tilt directions of any two adjacent ones of the liquid crystal domains define an angle of approximately 90 degrees between them.

In a specific preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. The first and third edge portions are parallel to a vertical direction and the second and fourth edge portions are parallel to the horizontal direction.

In an alternative preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. The first and third edge portions are parallel to the horizontal direction and the second and fourth edge portions are parallel to a vertical direction.

In another alternative preferred embodiment, if the horizontal direction of a display screen has an azimuthal angle of zero degrees, the first, second, third and fourth directions are an approximately 90 degree direction, an approximately 180 degree direction, an approximately 0 degree direction and an approximately 270 degree direction, respectively. The first and fourth edge portions are parallel to the horizontal direction and the second and third edge portions are parallel to a vertical direction.

In still another alternative preferred embodiment, if the horizontal direction of a display screen has an azimuthal angle of zero degrees, the first, second, third and fourth directions are an approximately 225 degree direction, an approximately 315 degree direction, an approximately 45 degree direction and an approximately 135 degree direction, respectively. The first, second, third and fourth edge portions are all parallel to a vertical direction.

In yet another preferred embodiment, the opaque portion is substantially triangular.

In yet another preferred embodiment, an opaque member includes a central opaque portion for selectively shielding at least a portion of a boundary area of each of the first, second, third and fourth liquid crystal domains, which is adjacent to another one of the liquid crystal domains, from incoming light.

In yet another preferred embodiment, the first substrate further includes a TFT, a gate bus line, a source bus line, a drain extension line, and a storage capacitor line. Either the opaque portion or the central opaque portion is defined by at least a portion of at least one line selected from the group consisting of the gate bus line, the source bus line, the drain extension line, and the storage capacitor line.

In yet another preferred embodiment, the second substrate further includes a black matrix layer, and either the opaque portion or the central opaque portion is defined by a portion of the black matrix layer.

In yet another preferred embodiment, the liquid crystal display device further includes two polarizers, which are arranged so as to face each other with the liquid crystal layer interposed between them and to have their transmission axes crossed at right angles. The first, second, third and fourth directions define an angle of approximately 45 degrees with respect to the transmission axes of the two polarizers.

In yet another preferred embodiment, the vertical alignment liquid crystal layer includes a liquid crystal material with negative dielectric anisotropy, and the at least one alignment film includes two alignment films that are arranged so as to sandwich the liquid crystal layer between them. The pretilt direction defined by one of the two alignment films is different from that defined by the other alignment film by approximately 90 degrees.

In yet another preferred embodiment, the at least one alignment film includes two alignment films that are arranged so as to sandwich the liquid crystal layer between them, and respective pretilt angles defined by the two alignment films are substantially equal to each other.

In yet another preferred embodiment, the at least one alignment film is an optical alignment film.

Effects of the Invention

According to the present invention, the display quality of a VA mode liquid crystal display device can be improved in terms of its viewing angle dependence, in particular. Also, according to the present invention, the display quality of a liquid crystal display device having a multi-domain structure defined by an alignment film can be improved.

Figure 2:
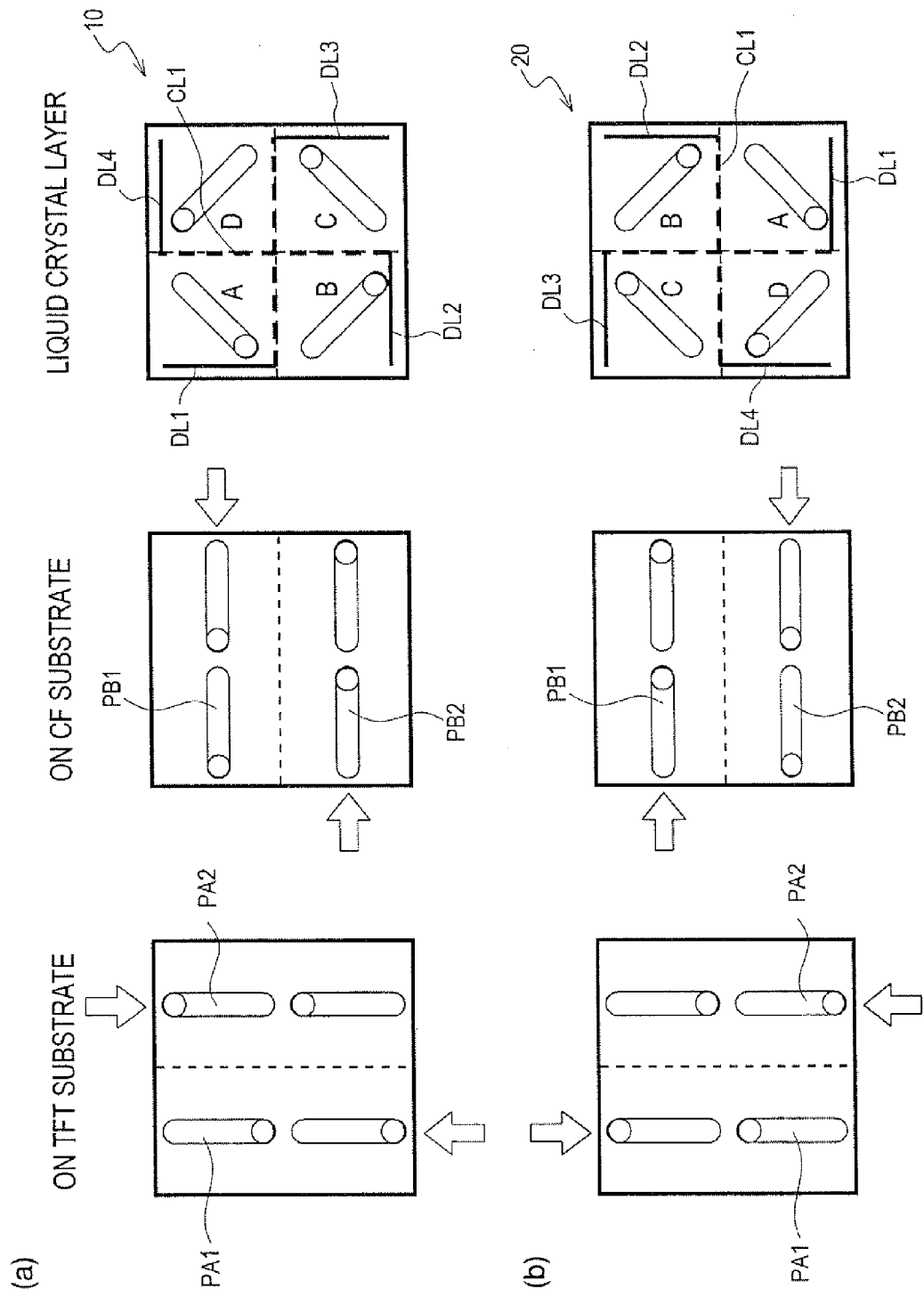

Portions (a) and (b) of FIG. 2 illustrate an exemplary pixel region with a multi-domain structure in a VA mode liquid crystal display device according to the present invention.

Figure 3:
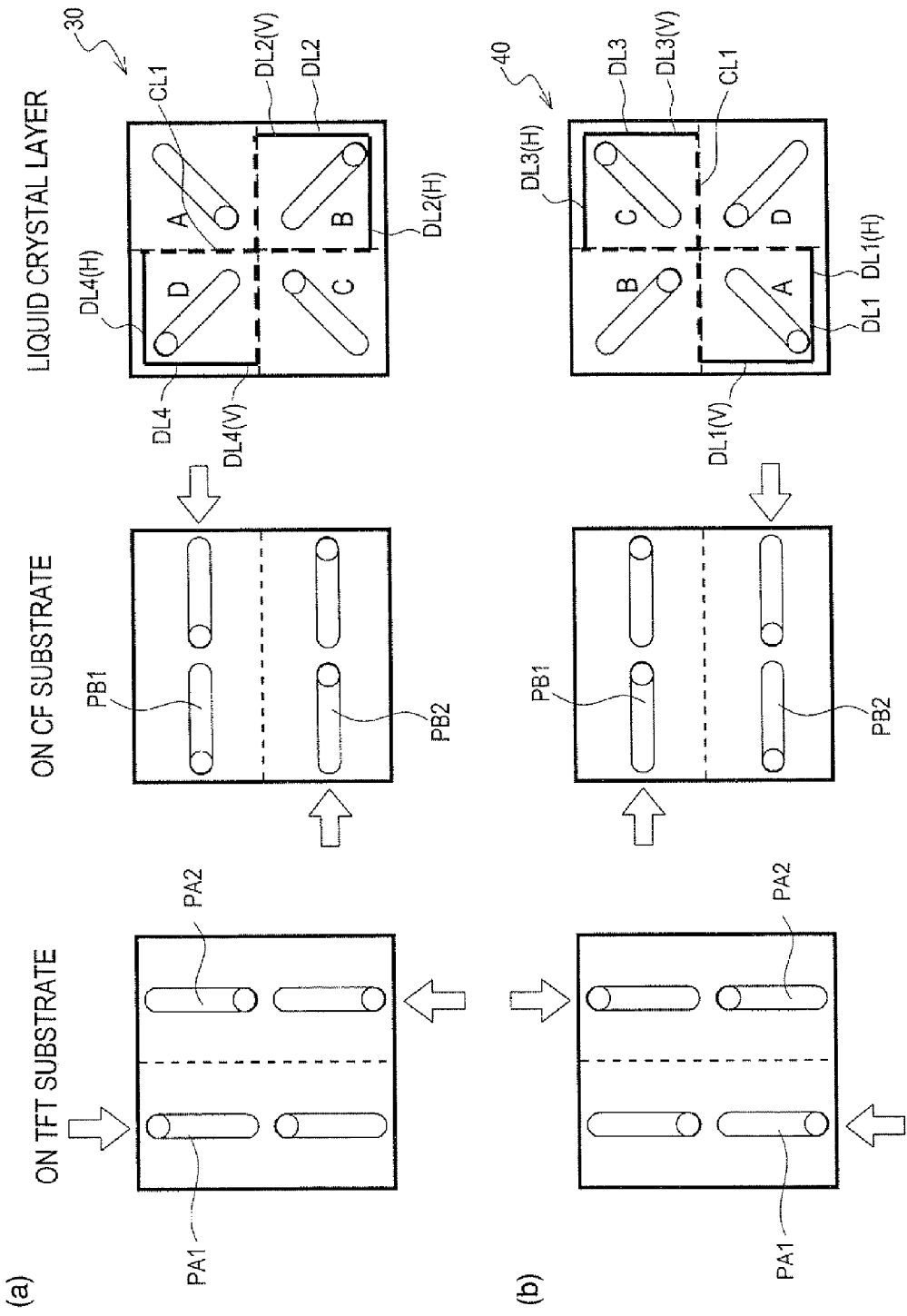

Portions (a) and (b) of FIG. 3 illustrate another exemplary pixel region with a multi-domain structure in a VA mode liquid crystal display device according to the present invention.

Figure 4:
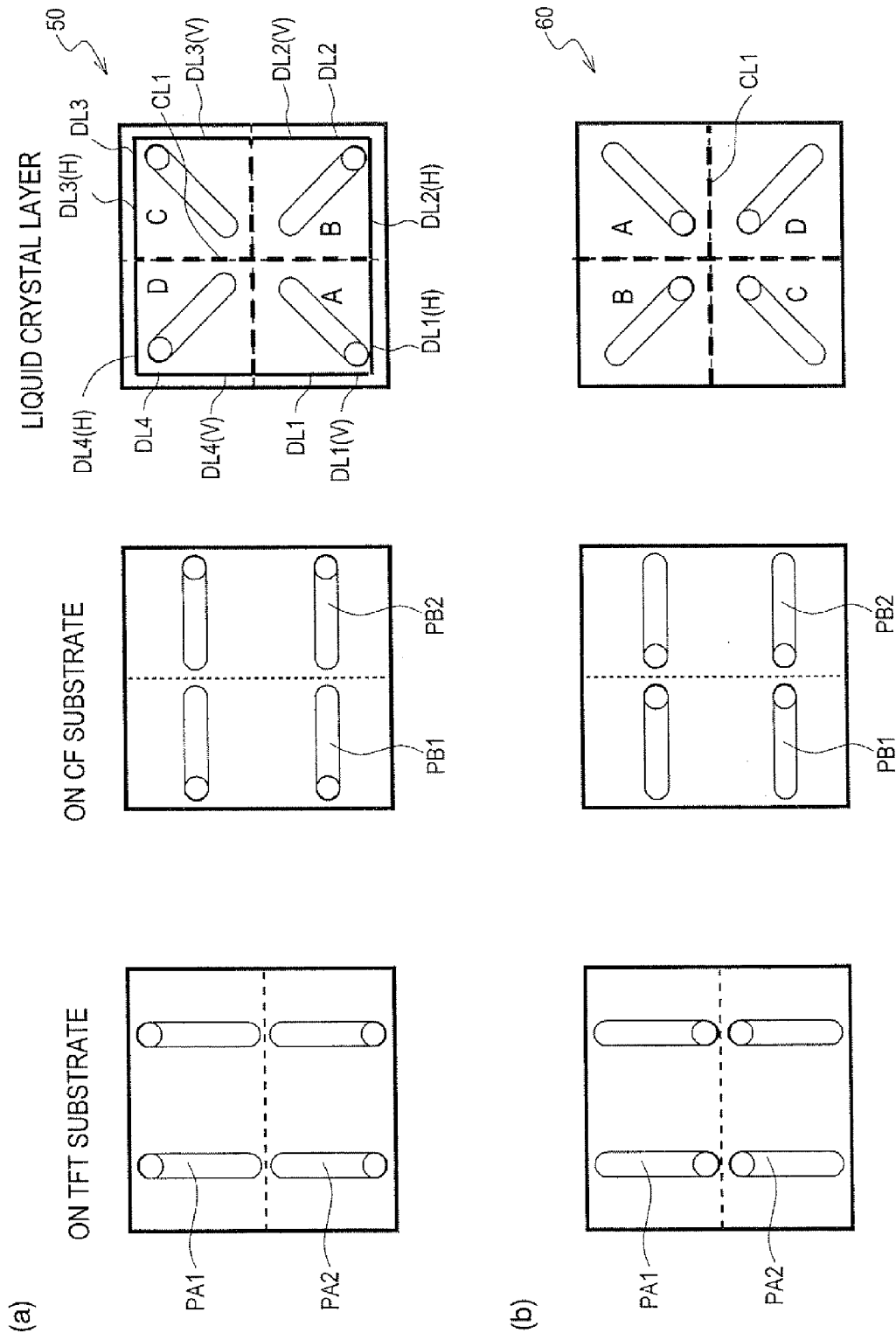

Portions (a) and (b) of FIG. 4 illustrate still another exemplary pixel region with a multi-domain structure in a VA mode liquid crystal display device according to the present invention.

Figure 5:
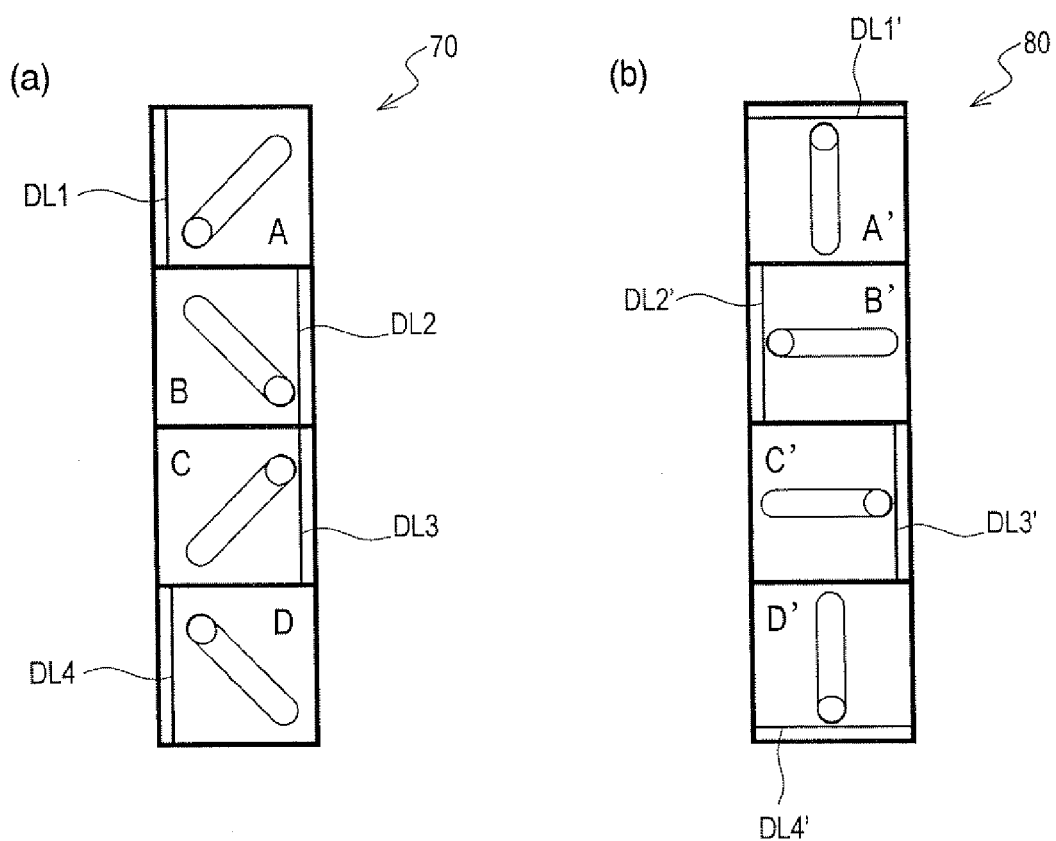

FIGS. 5(*a*) and 5(*b*) illustrate yet another exemplary pixel region with a multi-domain structure in a VA mode liquid crystal display device according to the present invention.

Figure 6:
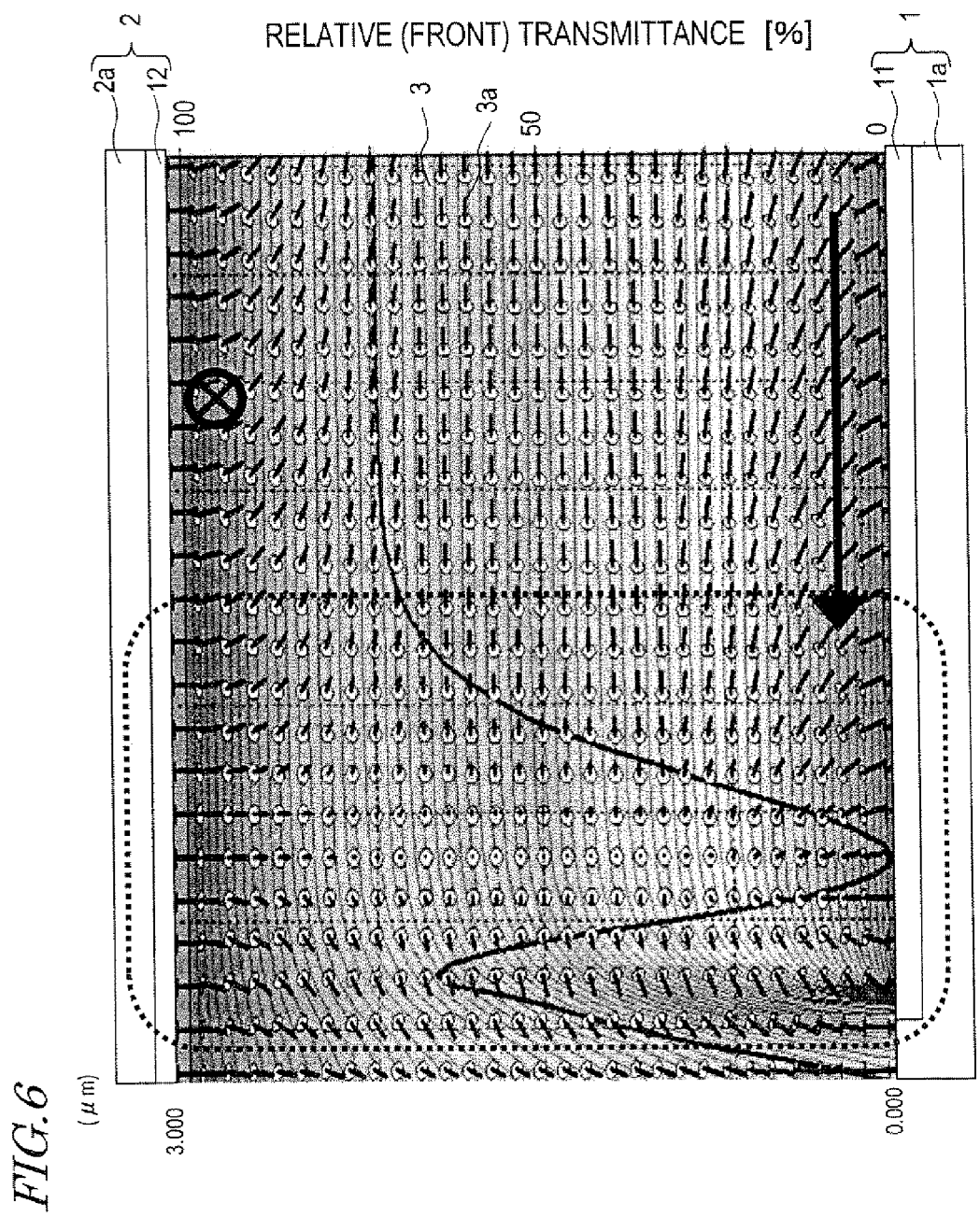

FIG. 6 is a cross-sectional view of a pixel region of a VA mode liquid crystal display device according to the present invention, showing the equipotential curve of an electric field created in the liquid crystal layer, the orientation directions of liquid crystal molecules in the layer, and the transmittance thereof, which were figured out by simulations.

Figure 7:
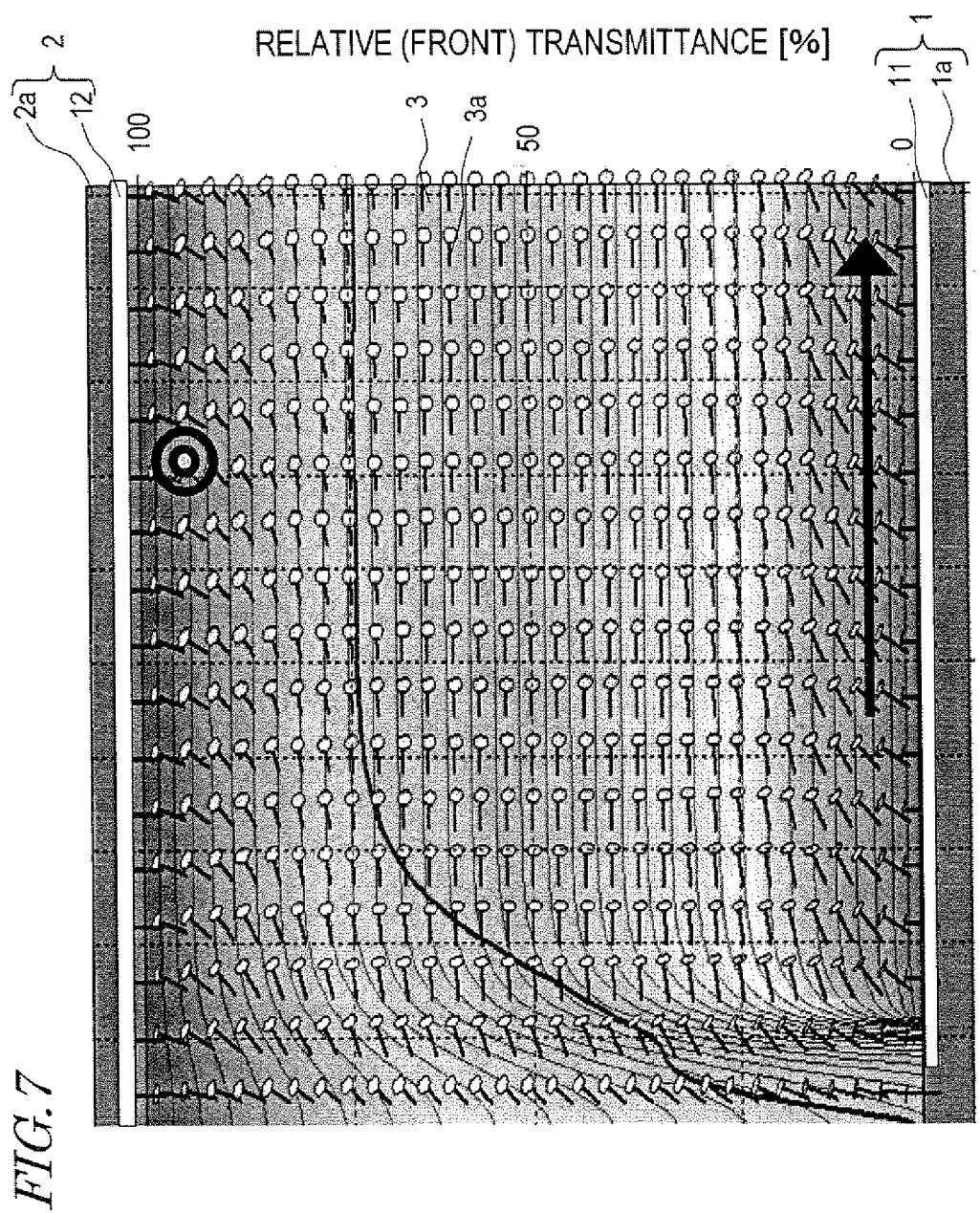

FIG. 7 is a cross-sectional view of a pixel region of a VA mode liquid crystal display device according to the present invention, showing the equipotential curve of an electric field created in the liquid crystal layer, the orientation directions of liquid crystal molecules in the layers and the transmittance thereof, which were figured out by simulations.

Figure 8:
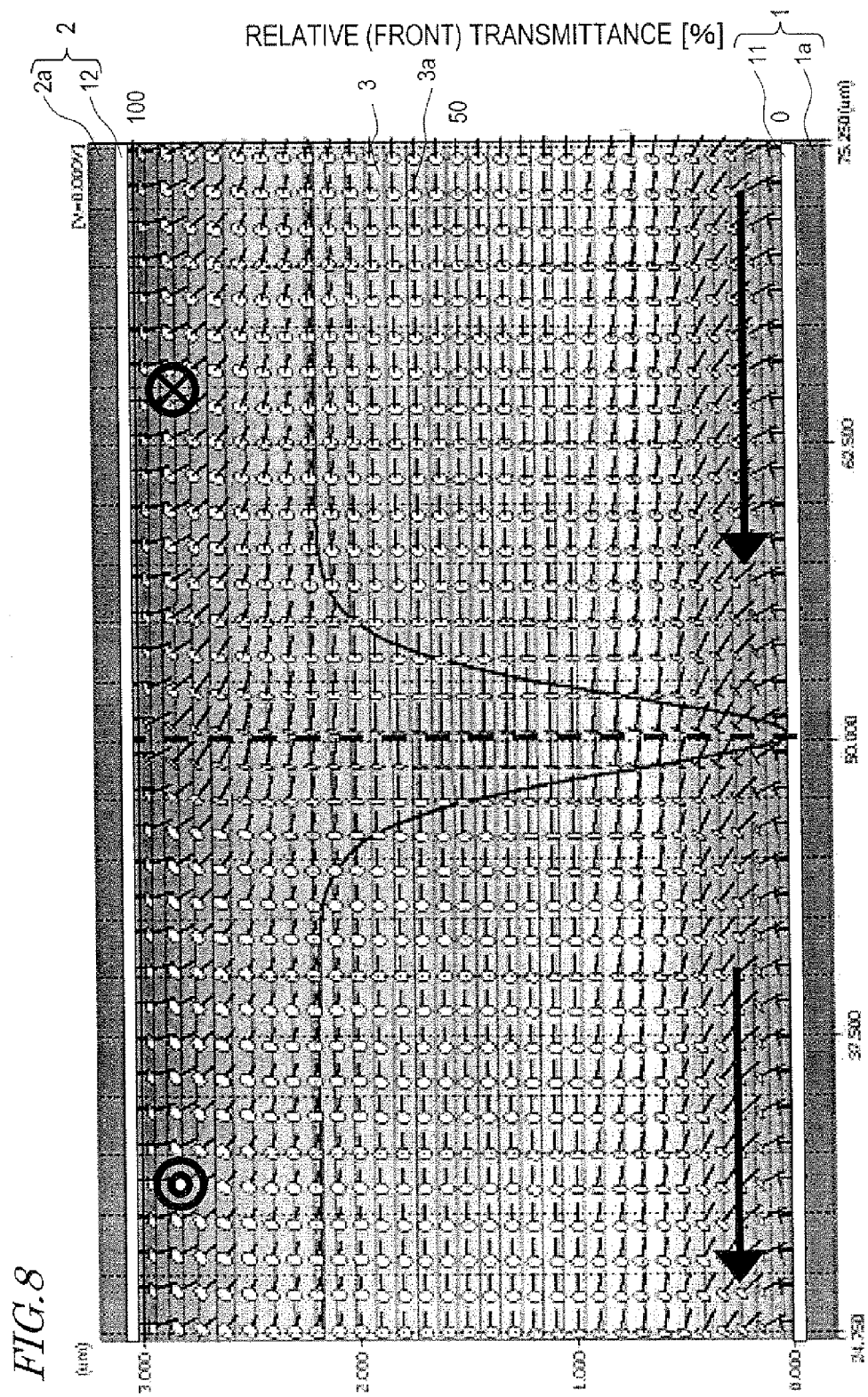

FIG. 8 is a cross-sectional view of a pixel region of a VA mode liquid crystal display device according to the present invention, showing the equipotential curve of an electric field created in the liquid crystal layer, the orientation directions of liquid crystal molecules in the layer, and the transmittance thereof, which were figured out by simulations.

Figure 9:
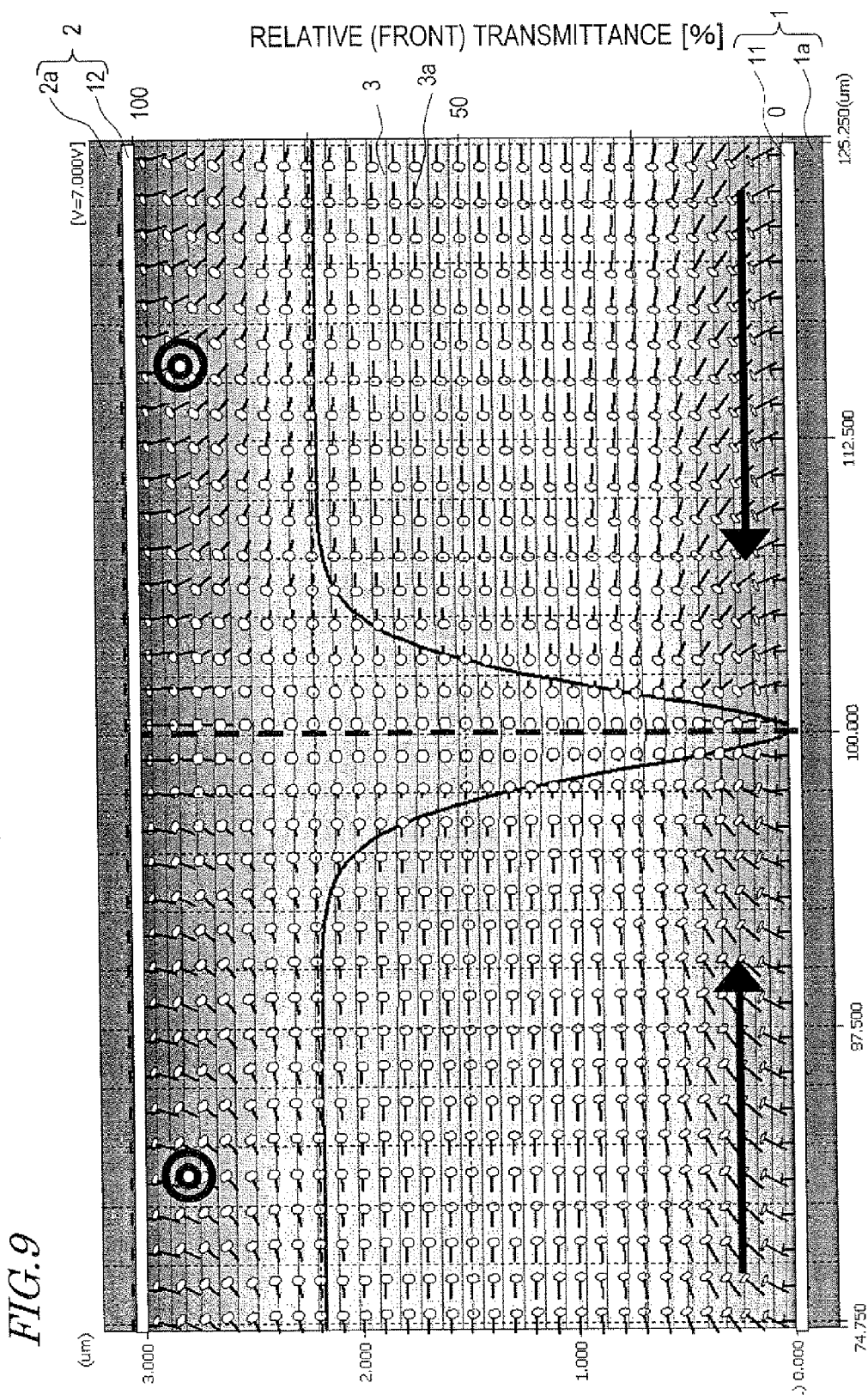

FIG. 9 is a cross-sectional view of a pixel region of a VA mode liquid crystal display device according to the present invention, showing the equipotential curve of an electric field created in the liquid crystal layer, the orientation directions of liquid crystal molecules in the layer, and the transmittance thereof, which were figured out by simulations.

Figure 10:
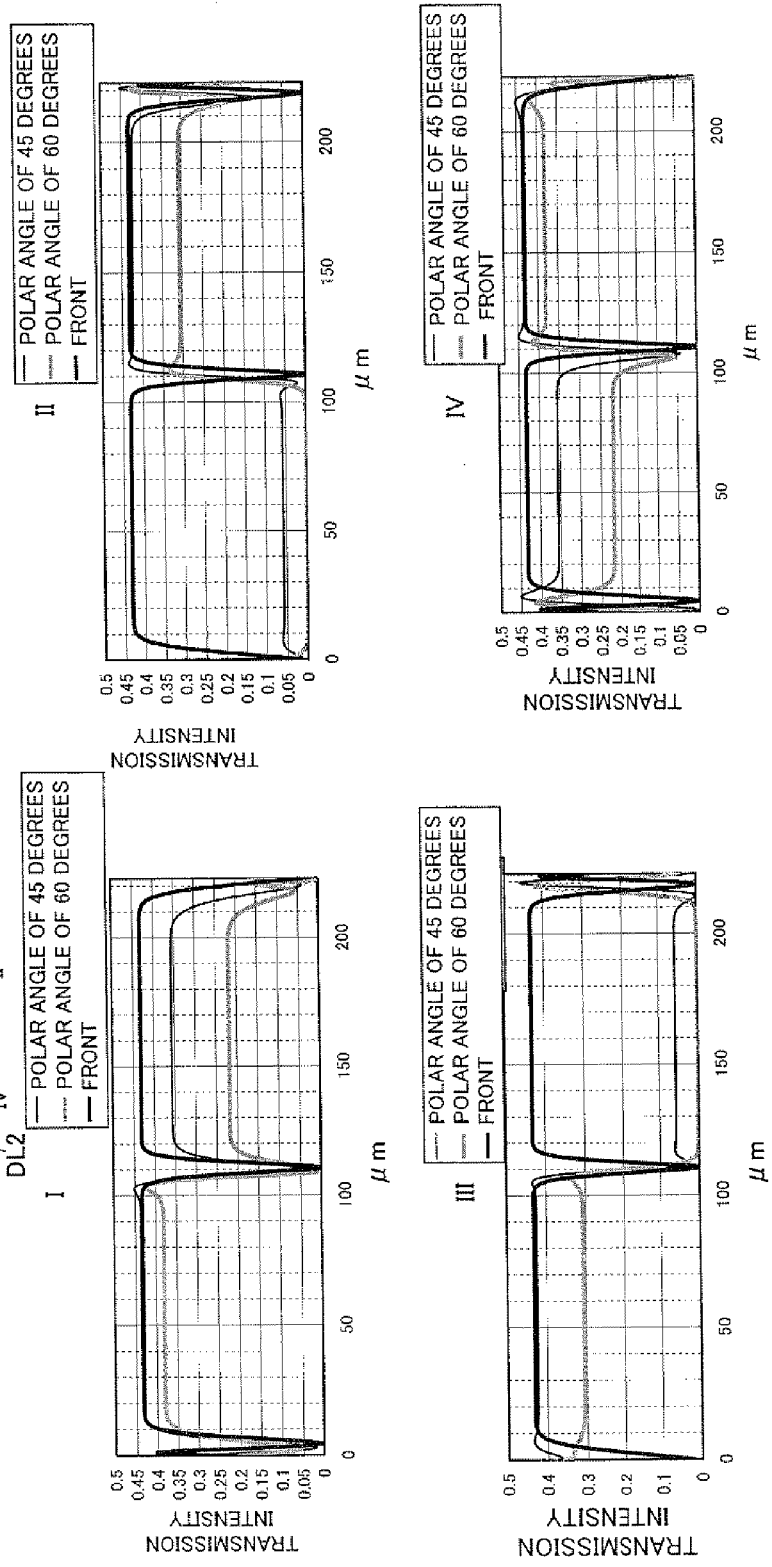

FIG. 10 is graphs showing the distributions of transmission intensities in a situation where the pixel region shown in portion (a) of FIG. 2 is viewed from the direction defined by an azimuth angle of 45 degrees.

Figure 11:
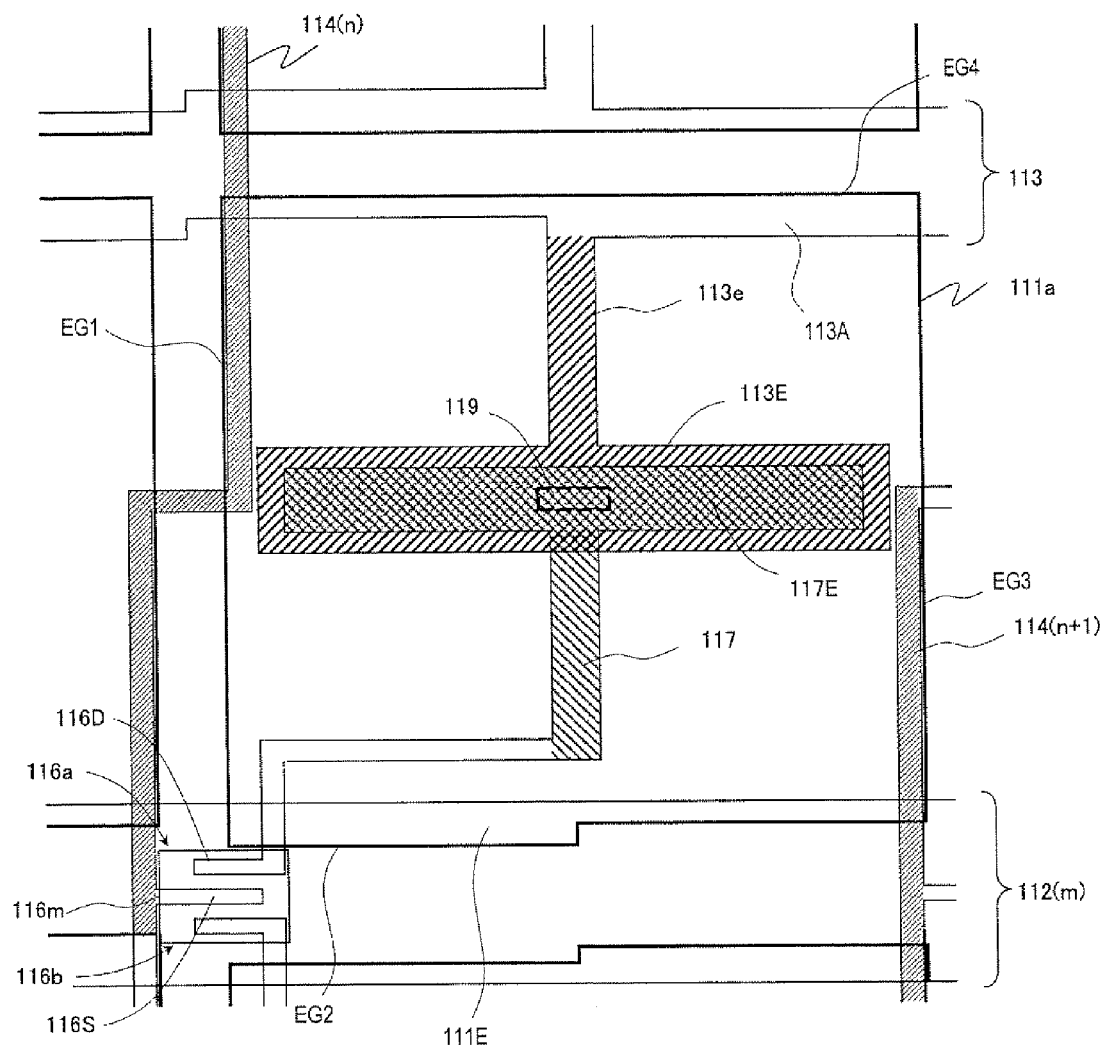

FIG. 11 is a schematic representation illustrating an exemplary pixel structure for a liquid crystal display device according to the present invention.

Figure 12:
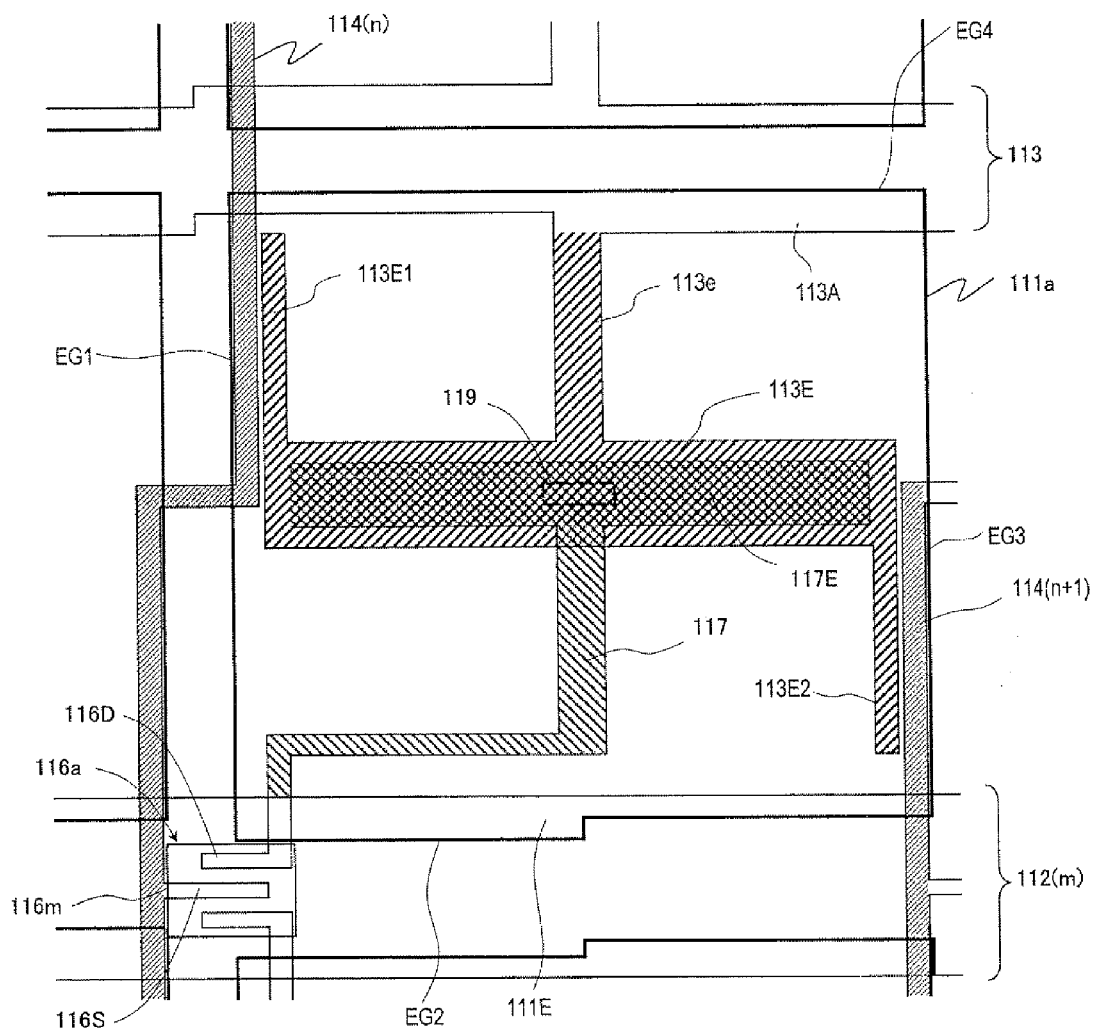

FIG. 12 is a schematic representation illustrating another exemplary pixel structure for a liquid crystal display device according to the present invention.

Figure 13:
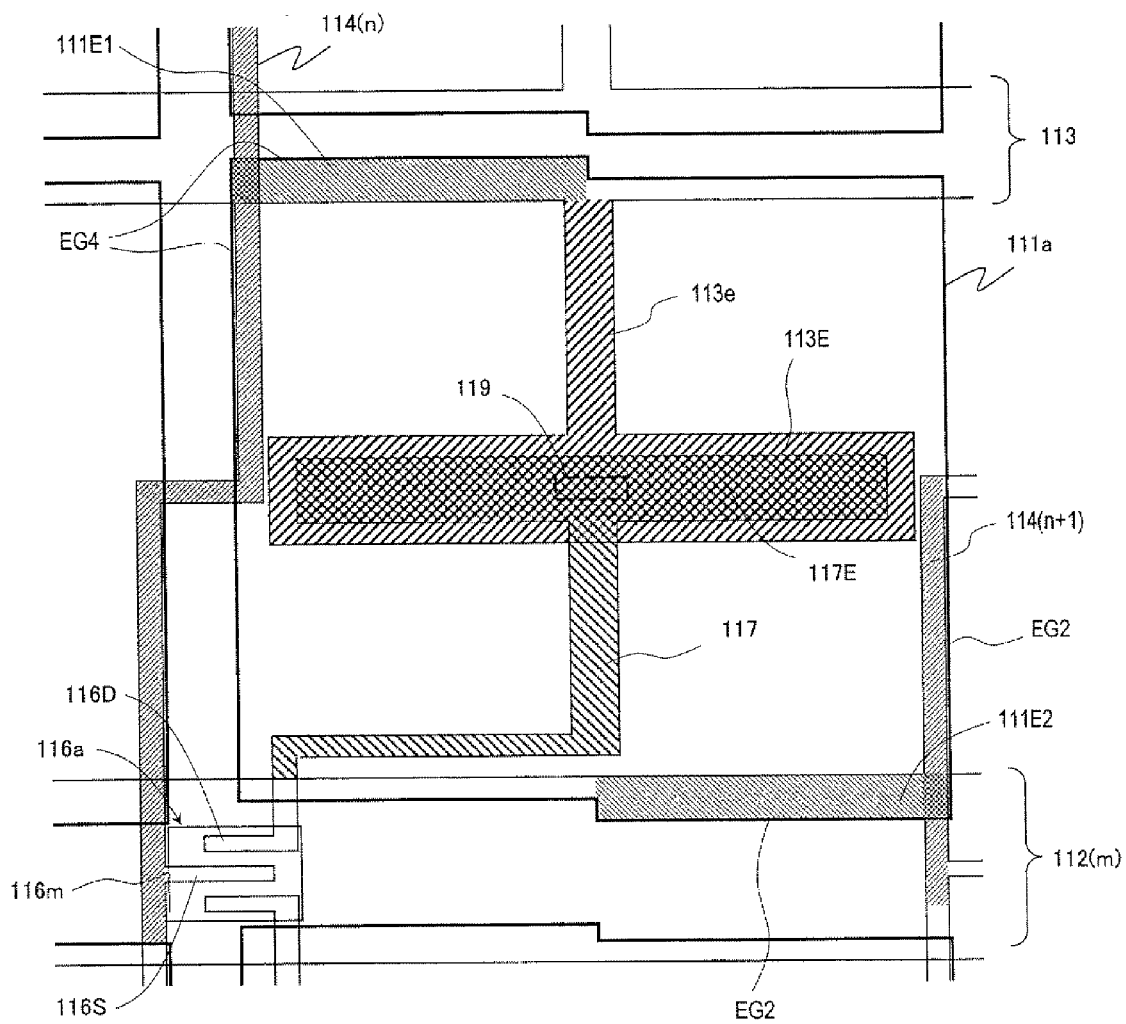

FIG. 13 is a schematic representation illustrating still another exemplary pixel structure for a liquid crystal display device according to the present invention.

Figure 14:
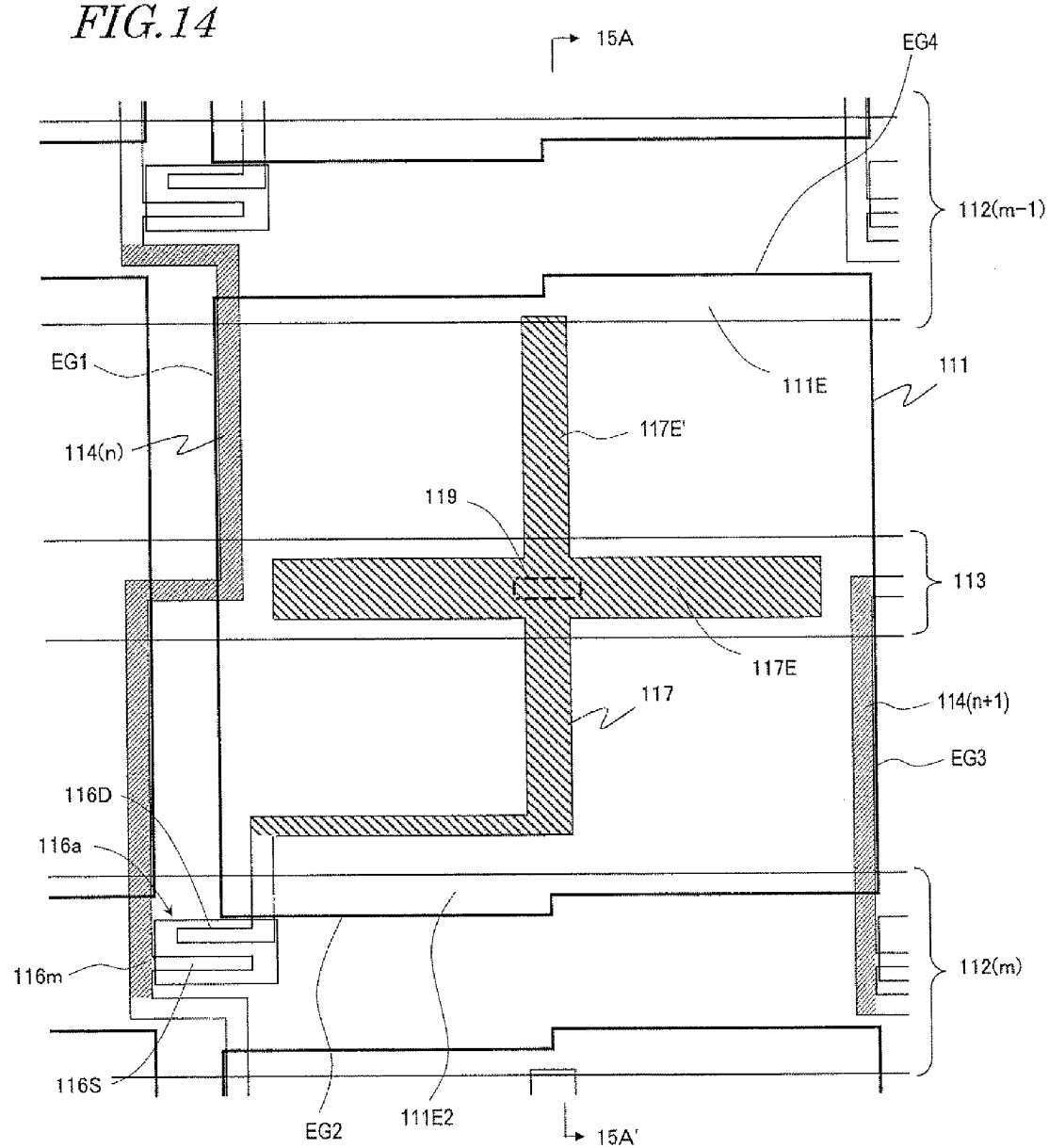

FIG. 14 is a schematic representation illustrating yet another exemplary pixel structure for a liquid crystal display device according to the present invention.

Figure 15:
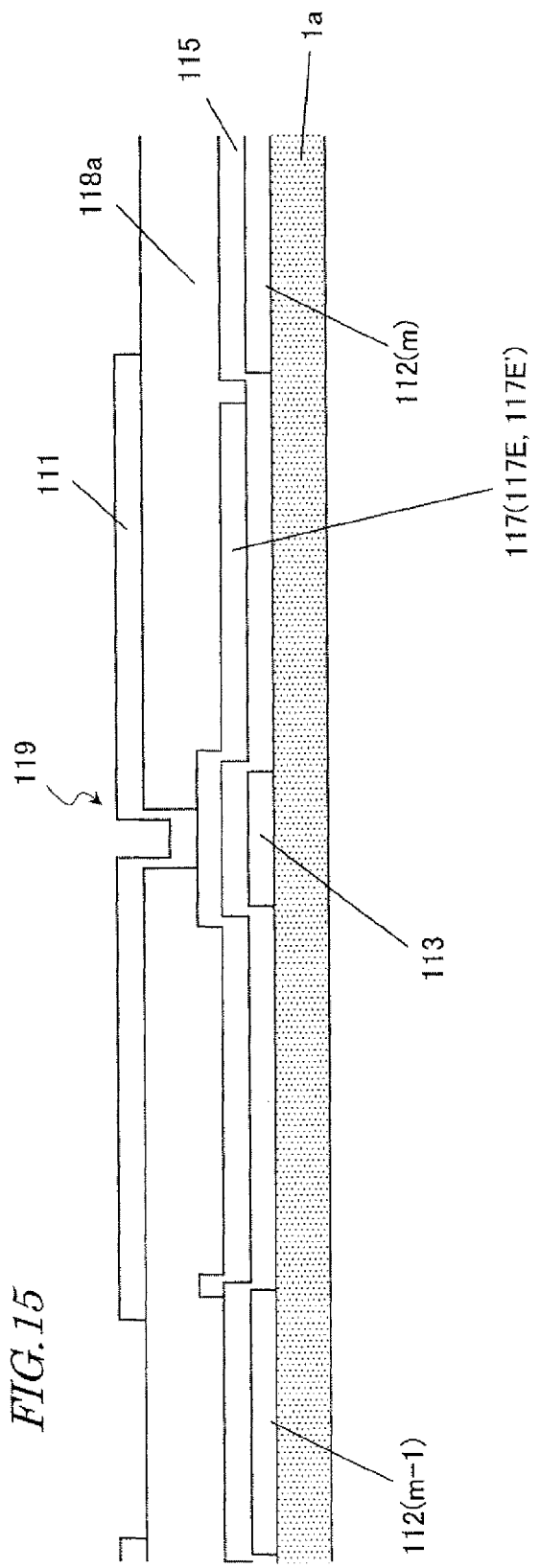

FIG. 15 is a cross-sectional view schematically illustrating the pixel structure shown in FIG. 14.

Figure 16:
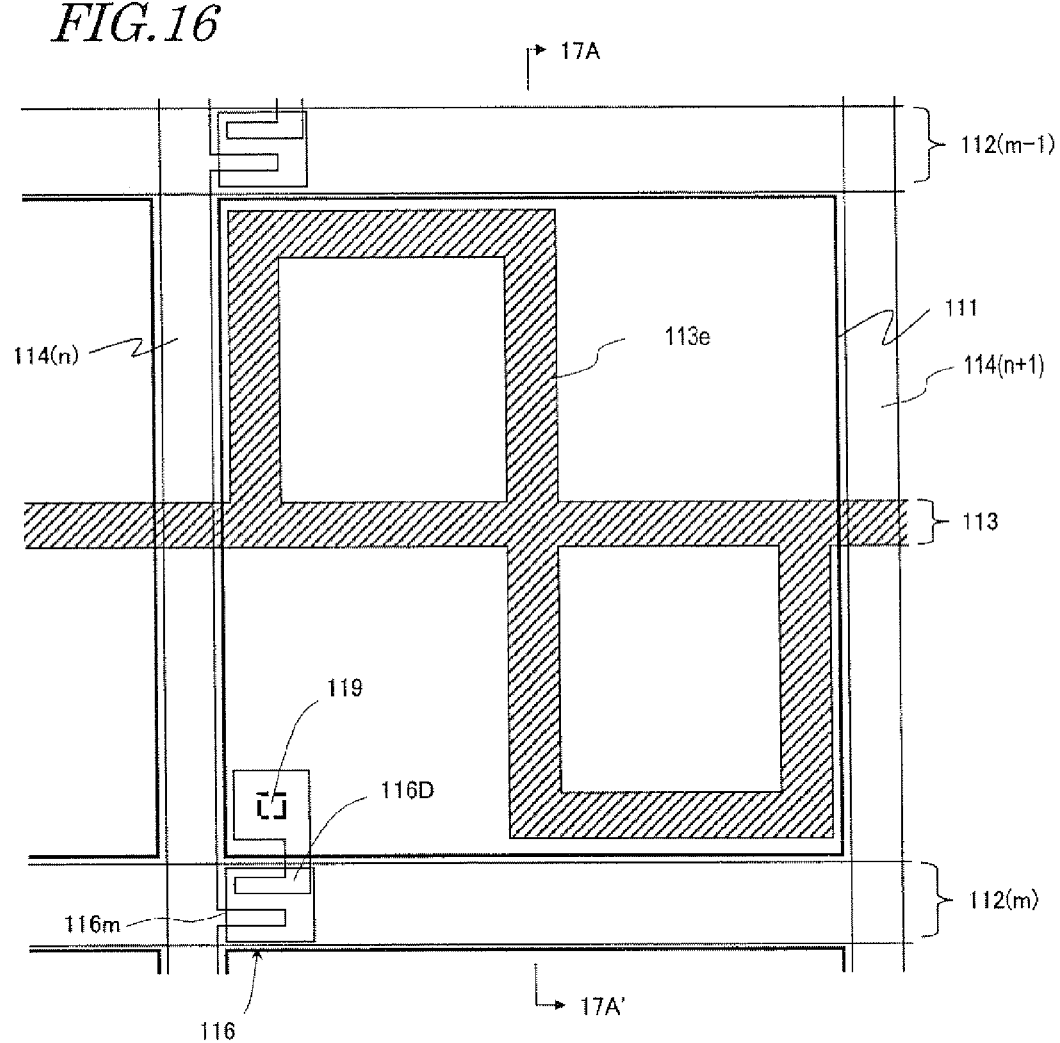

FIG. 16 is a schematic representation illustrating yet another exemplary pixel structure for a liquid crystal display device according to the present invention.

Figure 17:
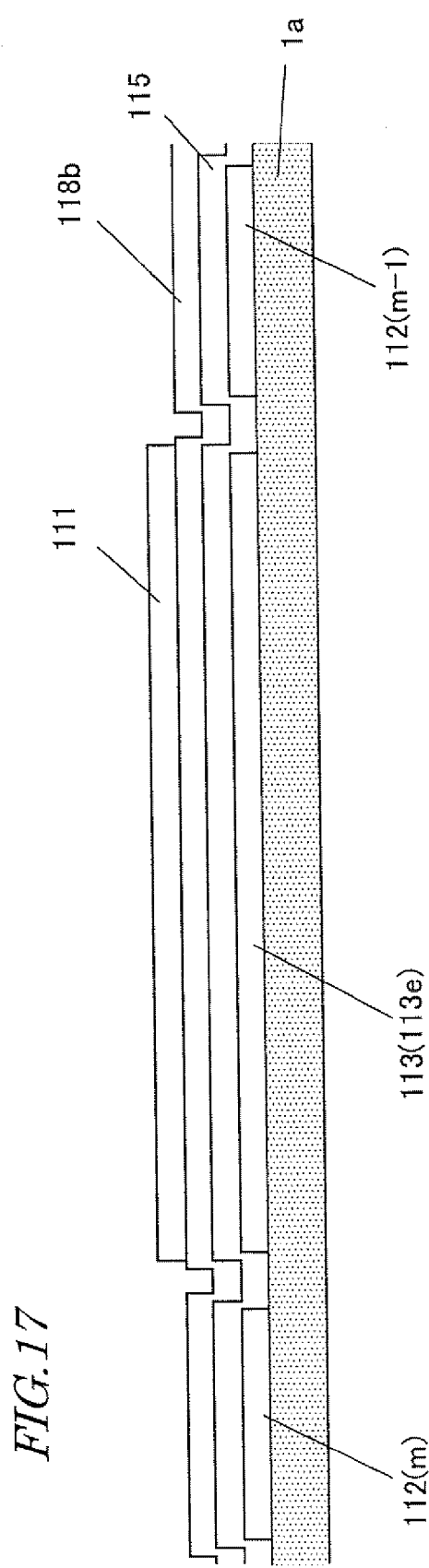

FIG. 17 is a cross-sectional view schematically illustrating the pixel structure shown in FIG. 16.

Figure 18:
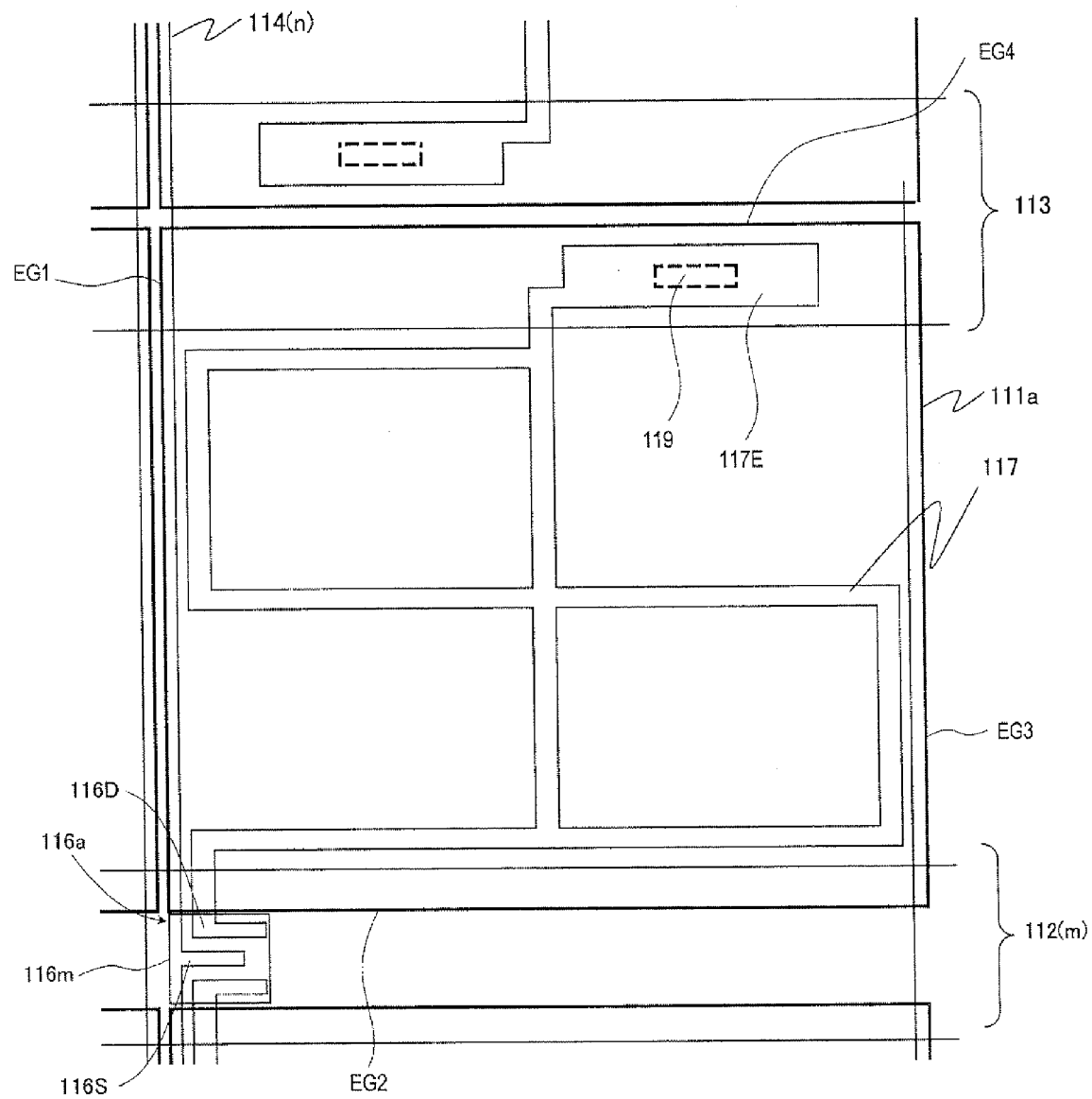

FIG. 18 is a schematic representation illustrating yet another exemplary pixel structure for a liquid crystal display device according to the present invention.

Figure 19:
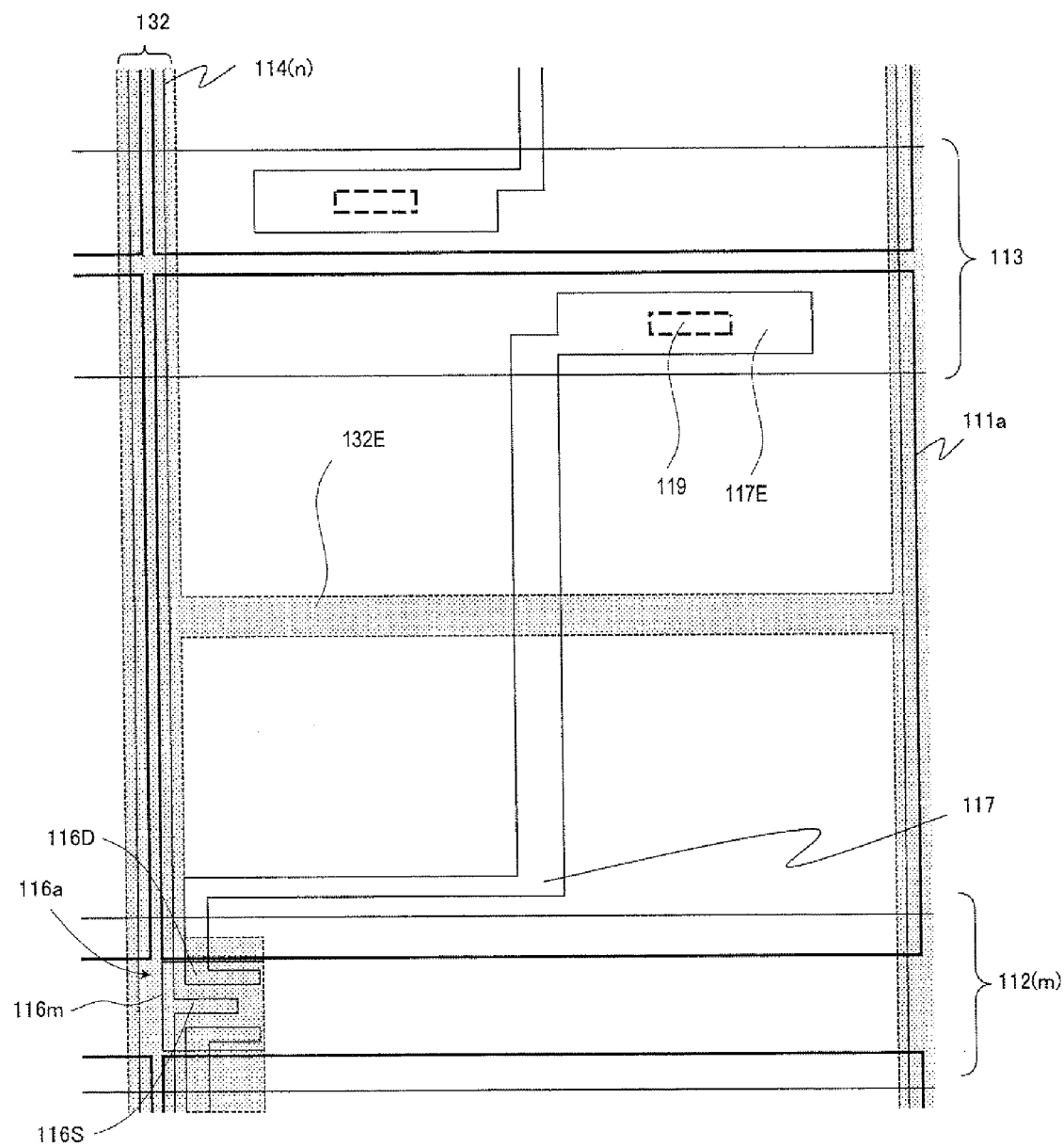

FIG. 19 is a schematic representation illustrating yet another exemplary pixel structure for a liquid crystal display device according to the present invention.

Figure 20:
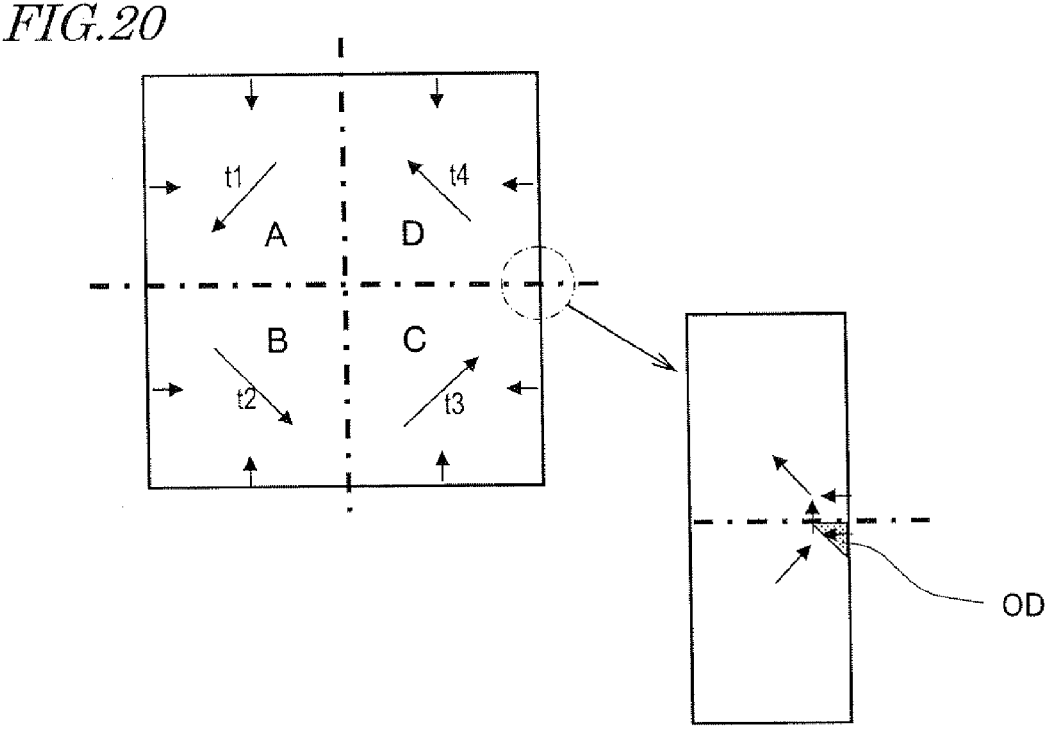

FIG. 20 is a schematic representation showing another area in which misalignment occurs in a pixel region with a multi-domain structure in a VA mode liquid crystal display device according to the present invention.

Figure 21:
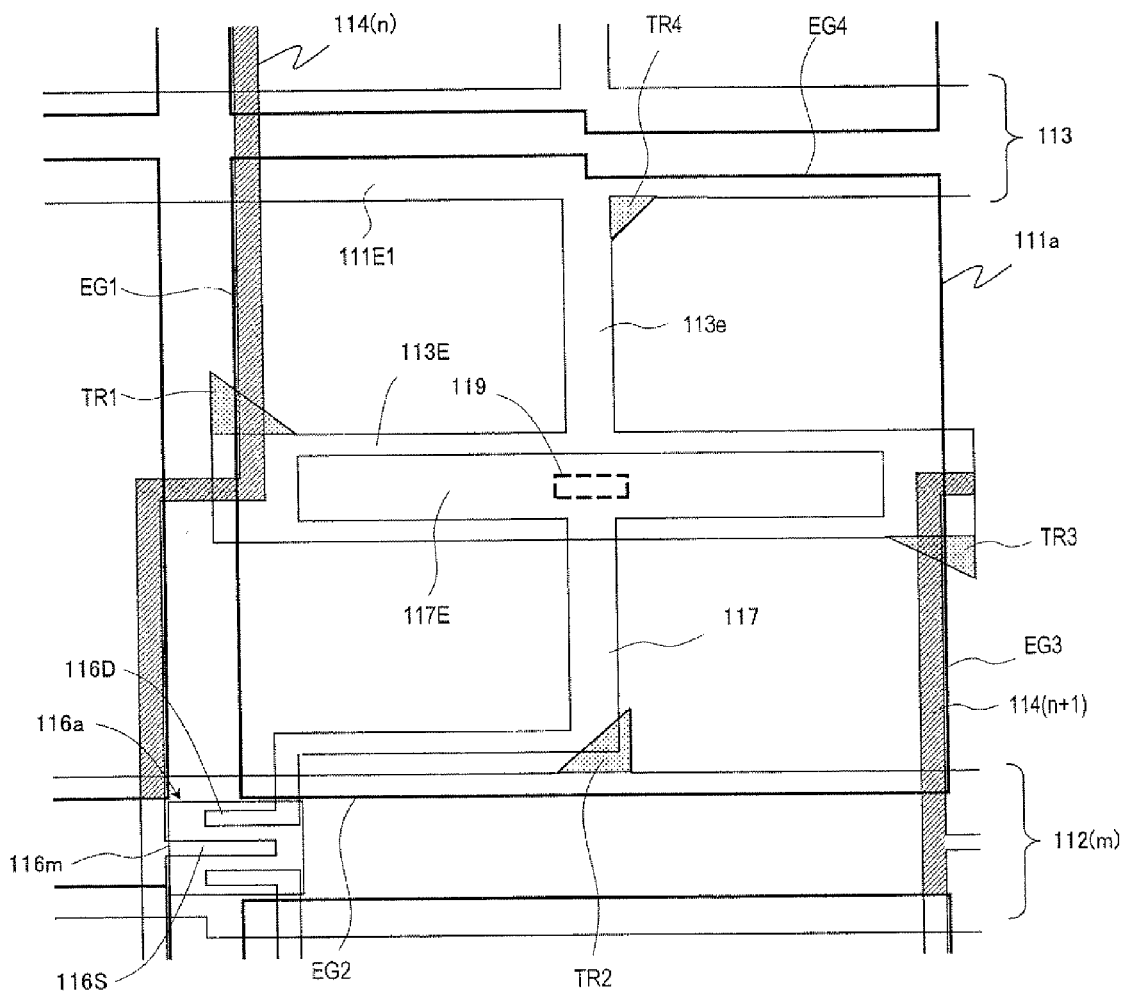

FIG. 21 is a schematic representation illustrating yet another exemplary pixel structure for a liquid crystal display device according to the present invention.

Figure 22:
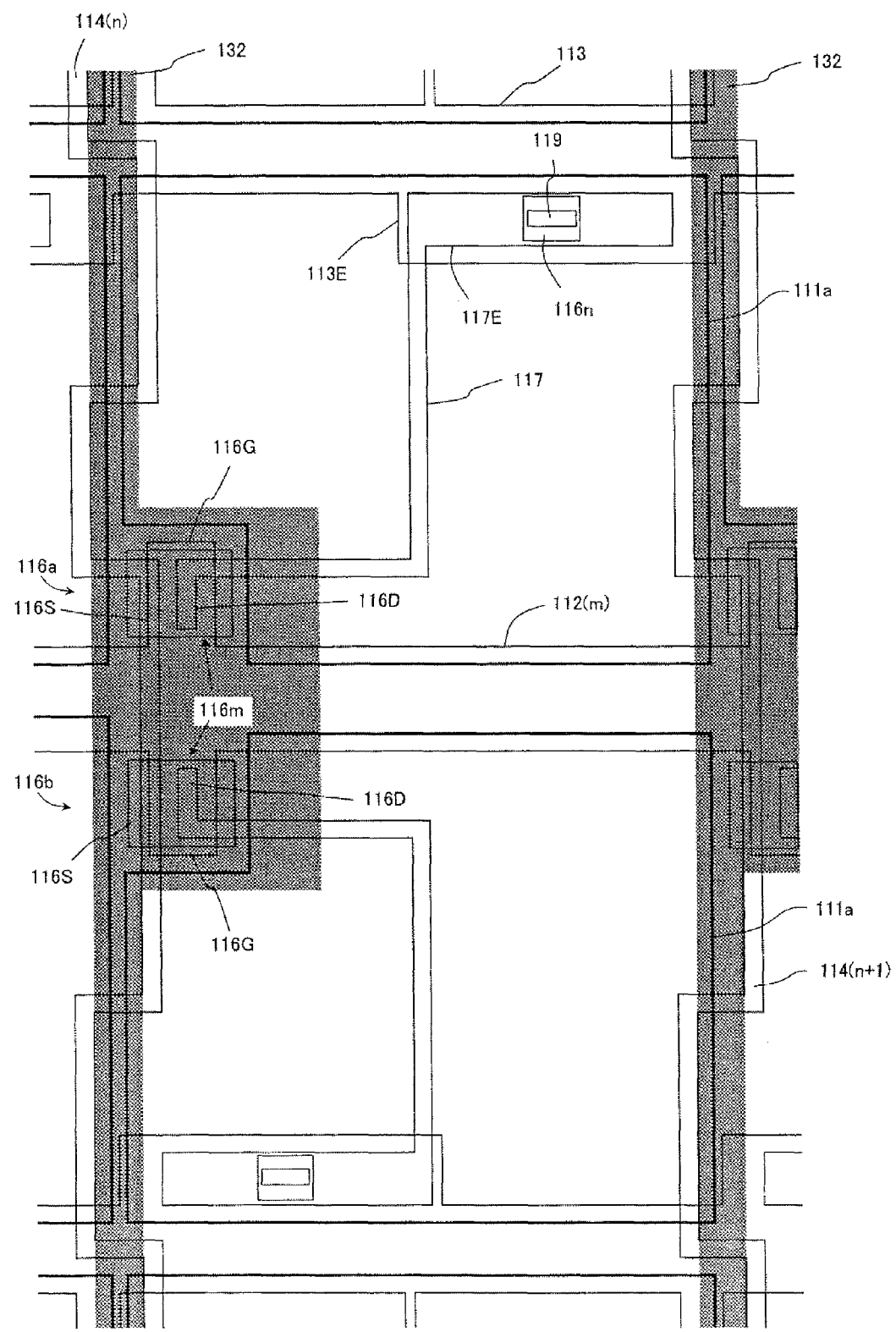

FIG. 22 is a schematic representation illustrating yet another exemplary pixel structure for a liquid crystal display device according to the present invention.

Figure 23:
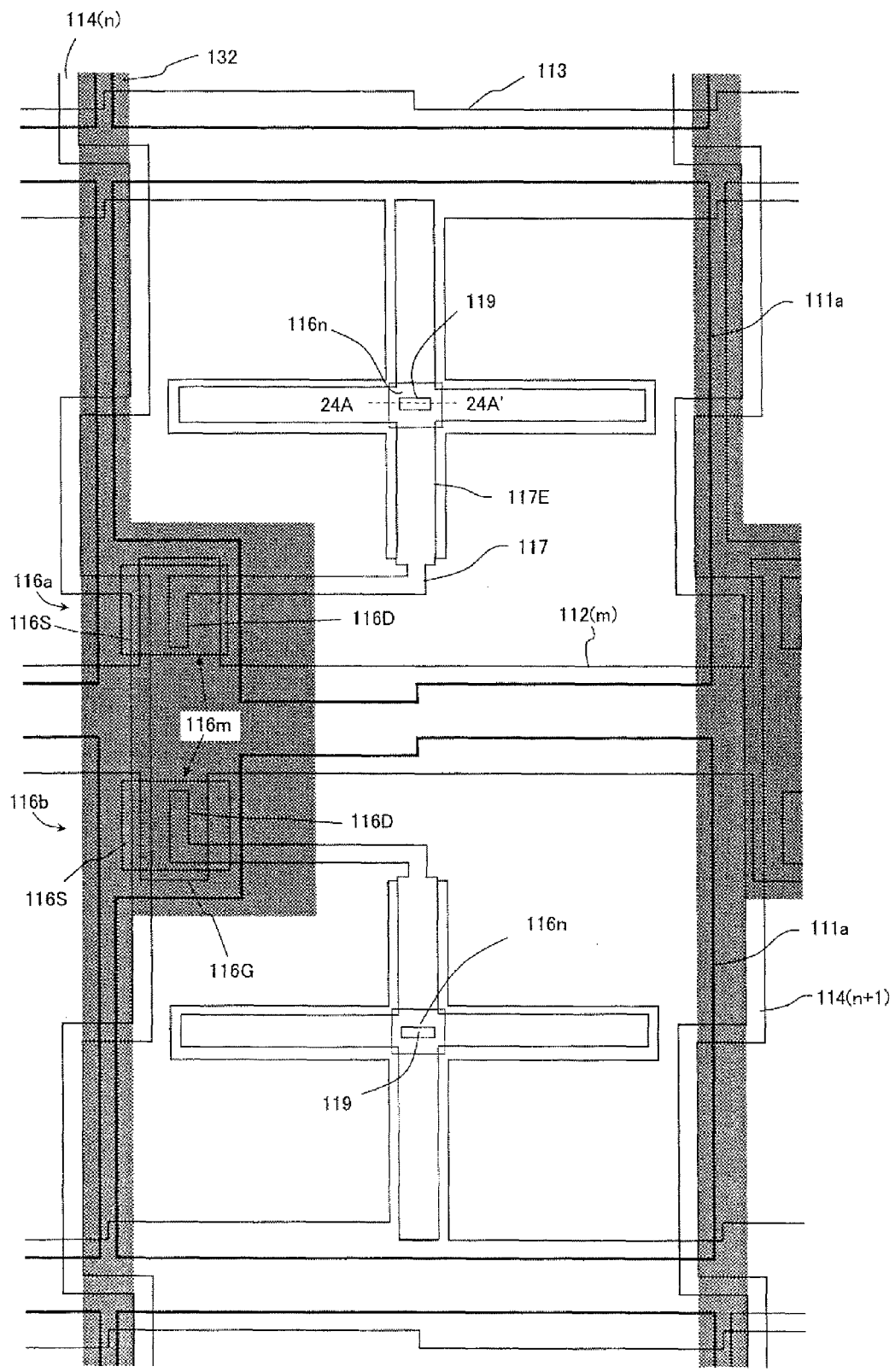

FIG. 23 is a schematic representation illustrating yet another exemplary pixel structure for a liquid crystal display device according to the present invention.

Figure 24:
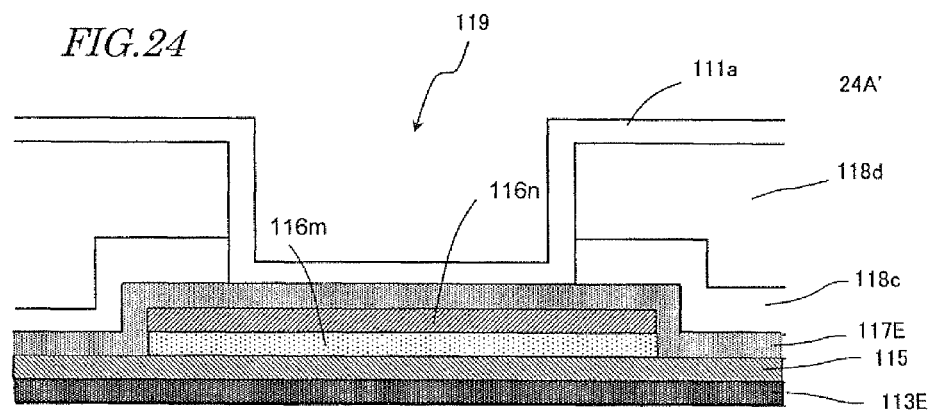

FIG. 24 is a schematic cross-sectional view of the structure shown in FIG. 23 as viewed on the plane 24A-24A'.

Figure 25:
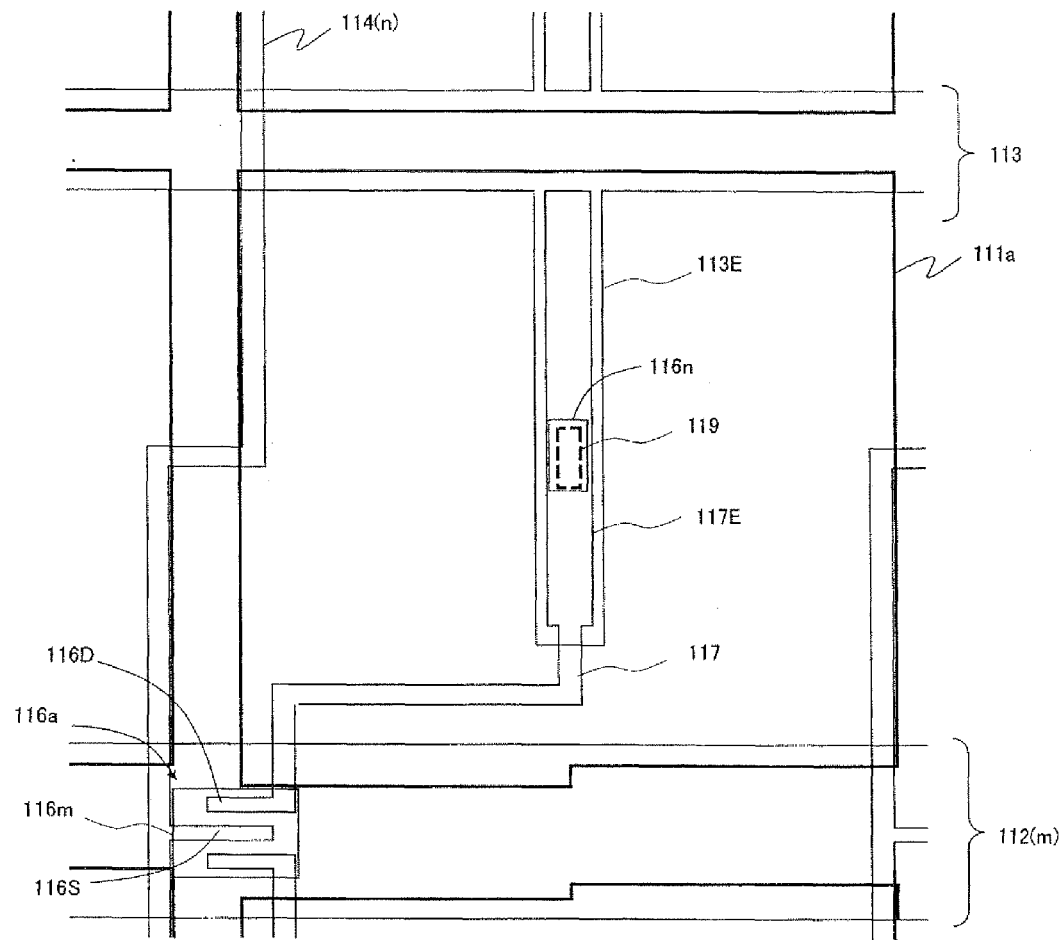

FIG. 25 is a schematic representation illustrating yet another exemplary pixel structure for a liquid crystal display device according to the present invention.

DESCRIPTION OF REFERENCE NUMERALS

1 TFT substrate
1a, 2a transparent substrate
2 CF substrate
3 liquid crystal layer
3a liquid crystal molecule
10 pixel region
11 pixel electrode
12 counter electrode
111 pixel electrode
111a subpixel electrode
111E broadened portion of pixel electrode or subpixel electrode
112 gate bus line
113 CS bus line (storage capacitor line)
113E extended portion of CS bus line
114 source bus line
116, 116a, 116b TFT
117 drain extension line
117E extended portion of drain extension line
SD1 to SD4 edges of pixel electrode
EG1 to EG4 edge portions of pixel electrode
A to D liquid crystal domain
t1 to t4 tilt direction (reference alignment direction)
e1 to e4 azimuth direction that is perpendicular to edge of pixel electrode and pointed inward in pixel electrode

BEST MODE FOR CARRYING OUT THE INVENTION

Hereinafter, preferred embodiments of a liquid crystal display device according to the present invention will be described with reference to the accompanying drawings. However, the present invention is in no way limited to the following specific preferred embodiments. According to the present invention, a liquid crystal display device, including a vertical alignment liquid crystal layer of which the pretilt direction is controlled by using at least one alignment film, has its display quality improved by providing an opaque film where misalignment occurs.

The display quality is affected to different degrees depending on where misalignment has occurred. That is why the type of misalignment to be hidden behind an opaque portion also changes with the display performance required. In the following description, three types of misalignment to occur in three different locations in a pixel region (namely, an electrode edge portion, a central portion and an intersection portion) will be described separately. These three locations may be shielded independently of each other. Two or more of these locations may be shielded in any arbitrary combination or all of them may be shielded, too.

As used herein, the "vertical alignment liquid crystal layer" means a liquid crystal layer in which the axis of liquid crystal molecules (which will be sometimes referred to herein as an "axis direction") defines a tilt angle of approximately 85 degrees or more with respect to the surface of a vertical alignment film. The liquid crystal molecules have negative dielectric anisotropy and are combined with polarizers that are arranged as crossed Nicols to conduct a display operation in normally black mode. The alignment film may be provided for at least one of the two substrates. However, to stabilize the alignment, each of the two substrates is preferably provided with an alignment film. In the preferred embodiment to be described below, each of the two substrates is provided with a vertical alignment film. Also, since every misalignment occurs within the multi-domain structure except that occurring in an electrode edge portion, a four-domain structure that realizes a particularly good viewing angle characteristic will be described as an example. As used herein, the "pixel" refers to a minimum unit for representing a particular gray scale tone on the screen, and corresponds to a unit for representing each gray scale tone of red (R), green (G) and blue (B) in color display and is also called a "dot". A combination of R, G and B pixels forms a single color display pixel. The "pixel region" refers to a region of a liquid crystal display device that is allocated to a single "pixel" on the screen. The "pretilt direction" is the orientation direction of liquid crystal molecules to be controlled with an alignment film and refers to an azimuthal direction on a display screen. Also, the angle formed by the liquid crystal molecules with respect to the surface of the alignment film in this case will be referred to herein as a "pretilt angle". The pretilt direction will be defined by subjecting the alignment film to a rubbing treatment or an optical alignment treatment. By changing the combinations of the pretilt directions of the two alignment films that face each other with the liquid crystal layer interposed between them, the four-domain structure can be formed. The quadruple pixel region includes four liquid crystal domains (which will be sometimes simply referred to herein as "domains"). Each of these liquid crystal domains is characterized by the tilt direction of liquid crystal molecules at the center of a plane of the liquid crystal layer, to which a voltage is being applied, and at the middle of the thickness of the liquid crystal layer. Such a tilt direction will be sometimes referred to herein as a "reference alignment direction". And this tilt direction (or reference alignment direction) will have an important effect on the viewing angle dependence of each domain. The tilt direction is also an azimuthal direction. The reference azimuthal direction is supposed to be the horizontal direction on the screen and the azimuth angle is supposed to increase counterclockwise. For example, comparing the display screen to a clock face, the three o'clock direction is supposed to have an azimuth angle of zero degrees and the angle is supposed to increase counterclockwise. By defining the tilt directions of the four liquid crystal domains such that an angle formed between any two of the four directions is approximately equal to an integral multiple of 90 degrees (e.g., as the twelve o'clock direction, the nine o'clock direction, the six o'clock direction and the three o'clock direction, respectively), highly uniform viewing angle characteristic and good display quality are realized. To increase the uniformity of the viewing angle characteristic, the areas of those four liquid crystal domains in the pixel region are preferably equalized with each other. Specifically, the difference between the area of the largest one of the four liquid crystal domains and that of the smallest one of the four is preferably no greater than 25% of the largest area.

The vertical alignment liquid crystal layer of the preferred embodiment to be described below includes a nematic liquid crystal material with negative dielectric anisotropy. The pretilt directions defined by the two alignment films that sandwich the liquid crystal layer between them are different from each other by approximately 90 degrees. The tilt angle (i.e., the reference alignment direction) is defined as an intermediate direction between these two pretilt directions. No chiral agent is added to the liquid crystal layer. And when a voltage is applied to the liquid crystal layer, the liquid crystal molecules located near the alignment films will have a twisted alignment under the anchoring force of the alignment films. If necessary, a chiral agent may be added to the liquid crystal layer. By using such a pair of vertical alignment films defining two pretilt directions (alignment treatment directions) that are perpendicular to each other, the VA mode in which the liquid crystal molecules have a twisted alignment is sometimes called a vertical alignment twisted nematic (VATN) mode (see Patent Document No. 2, for example).

In the VATN mode, the pretilt angles defined by the two alignment films are preferably substantially equal to each other as disclosed by the applicant of the present application in Japanese Patent Application No. 2005-141846. By using such a pair of alignment films defining pretilt angles that are approximately equal to each other, the display luminance can be increased. Particularly when the difference between the pretilt angles defined by the two alignment films is within one degree, the tilt direction (i.e., the reference alignment direction) of liquid crystal molecules, located approximately at the middle of the thickness of the liquid crystal layer, can be controlled with good stability and the display luminance can be increased. This is probably because if the difference between the pretilt angles were more than one degree, then the tilt direction would vary noticeably from one location to another in the liquid crystal layer and the transmittance would vary significantly as a result (i.e., some area would have a lower transmittance than a desired one).

According to known methods, the pretilt direction of liquid crystal molecules may be defined by alignment films by subjecting the alignment films to a rubbing treatment or an optical alignment treatment, by forming a microstructure on an undercoat film for each alignment film and transferring the pattern of the microstructure onto the surface of the alignment film, or by evaporating obliquely an inorganic material such as SiO on an alignment film to define a microstructure thereon. Considering its mass productivity, either the rubbing treatment or the optical alignment treatment is preferred. Among other things, the optical alignment treatment is particularly preferred to increase the yield because that treatment is a non-contact method and generates no static electricity due to friction unlike the rubbing treatment. Also, as described in Japanese Patent Application No. 2005-141846 mentioned above, by using an optical alignment film including a photosensitive group, the variation in pretilt angle can be reduced to one degree or less. The optical alignment film preferably includes at least one photosensitive group selected from the group consisting of a 4-chalcone group, a 4'-chalcone group, a coumarin group, and a cinnamoyl group to name a few.

The preferred embodiment to be described below is a TFT LCD as a typical example. However, the present invention is naturally applicable for use in a liquid crystal display device that adopts any other driving method.

Edge Portion and Central Portion

First, misalignment that may occur in an electrode edge portion will be described.

The present inventors discovered that when a voltage was applied to a liquid crystal display device including a vertical alignment liquid crystal layer, of which the pretilt direction was controlled using an alignment film, to present a gray scale tone thereon, an area, which looked darker than the gray scale tone being presented when viewed straight, appeared inside of, and substantially parallel to, an edge portion of a pixel electrode. In the multi-domain structure, if at any of the edges of a pixel electrode, to which a liquid crystal domain is located close, the azimuthal direction that is perpendicular to the edge and that points toward the inside of the pixel electrode defines an angle greater than 90 degrees with respect to the tilt direction (i.e., the reference alignment direction) of the liquid crystal domain, the area that looks darker than the gray scale tone being presented will appear inside of, and substantially parallel to, that edge. The alignment state of the liquid crystal molecules will be disturbed in that area probably because the tilt direction of the liquid crystal domain and the direction in which the anchoring force is produced by an oblique electric field at the edge of the pixel electrode have opposing components.

As used herein, the "gray scale tone" refers to any tone except black (i.e., the lowest tone) and white (i.e., the highest tone). The dark area always appears when a non-black gray scale tone (including white) is presented as a matter of principle. However, the dark area is easier to perceive at a relatively high gray scale tone. Also, unless a particular viewing direction is specified, the display state is always supposed to be a front viewing state (i.e., when the screen is viewed perpendicularly by a viewer located right in front of the screen).

Figure 1:
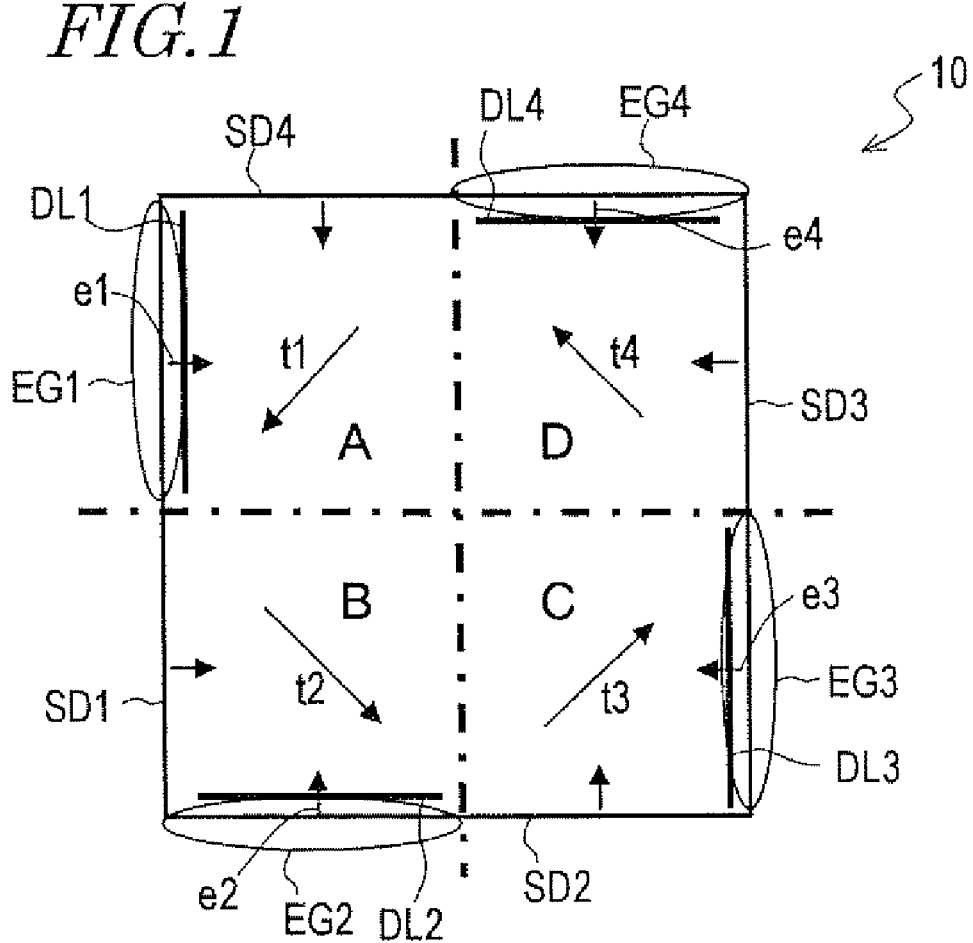
FIG. 1 illustrates an exemplary pixel region with a multi-domain structure in a VA mode liquid crystal display device according to the present invention.

The quadruple pixel region 10 shown in FIG. 1 will be described. FIG. 1 illustrates a pixel region 10 provided for a substantially square pixel electrode for the sake of simplicity. However, the present invention is in no way limited to any particular shape of a pixel region.

The pixel region 10 includes four liquid crystal domains A, B, C and D, of which the tilt directions (i.e., reference alignment directions) are identified by t1, t2, t3 and t4, respectively. These four tilt directions are defined such that an angle formed between any two of the four directions is approximately equal to an integral multiple of 90 degrees. This is an ideal quadruple structure to achieve the best viewing angle characteristic because the areas of these liquid crystal domains A, B, C and D are equal to each other. The four liquid crystal domains A, B, C and D are arranged in two columns and two rows to define a matrix pattern.

The pixel electrode has four edges (or sides) SD1, SD2, SD3 and SD4. An oblique electric field to be generated responsive to a voltage applied produces an anchoring force that has a component that is perpendicular to any of these sides and that points toward the inside of the pixel electrode (in an azimuthal direction). In the example shown in FIG. 1, the azimuthal directions that are perpendicular to the four edges SD1, SD2, SD3 and SD4 and that point toward the inside of the pixel electrode are identified by e1, e2, e3 and e4, respectively.

Each of the four liquid crystal domains is close to two out of the four edges of the pixel electrode. While a voltage is being applied thereto, each liquid crystal domain is subjected to the anchoring forces that have been produced at those edges by the oblique electric field.

In an edge portion EG1 of one edge of the pixel electrode, to which the liquid crystal domain A is located close, the azimuthal direction e1 that is perpendicular to the edge portion EG1 and that points toward the inside of the pixel electrode defines an angle greater than 90 degrees with respect to the tilt direction t1 of the liquid crystal domain, and misalignment occurs in that area. As a result, when a voltage is applied thereto, the liquid crystal domain A produces an area that looks darker than the other areas (which will be referred to herein as a "domain line DL1") parallel to this edge portion EG1. It should be noted that in this case, the two polarizers are arranged so as to face each other with the liquid crystal layer interposed between them and to have their transmission axes (polarization axes) crossed at right angles. That is to say, one of the two polarization axes is arranged horizontally and the other vertically. The transmission axes of the polarizers are supposed to be arranged in this manner unless otherwise stated.

In the same way, in an edge portion EG2 of one edge of the pixel electrode, to which the liquid crystal domain B is located close, the azimuthal direction e2 that is perpendicular to the edge portion EG2 and that points toward the inside of the pixel electrode defines an angle greater than 90 degrees with respect to the tilt direction t2 of the liquid crystal domain, and misalignment occurs in that area. As a result, when a voltage is applied thereto, the liquid crystal domain B may produce an area that looks darker than the other areas (which will be referred to herein as a "domain line DL2") parallel to this edge portion EG2.

In the same way, in an edge portion EG3 of one edge of the pixel electrode, to which the liquid crystal domain C is located close, the azimuthal direction e3 that is perpendicular to the edge portion EG3 and that points toward the inside of the pixel electrode defines an angle greater than 90 degrees with respect to the tilt direction t3 of the liquid crystal domain, and misalignment occurs in that area.

As a result, when a voltage is applied thereto, the liquid crystal domain C may produce an area that looks darker than the other areas (which will be referred to herein as a "domain line DL3") parallel to this edge portion EG3.

In the same way, in an edge portion EG4 of one edge of the pixel electrode, to which the liquid crystal domain D is located close, the azimuthal direction e4 that is perpendicular to the edge portion EG4 and that points toward the inside of the pixel electrode defines an angle greater than 90 degrees with respect to the tilt direction t4 of the liquid crystal domain, and misalignment occurs in that area. As a result, when a voltage is applied thereto, the liquid crystal domain D may produce an area that looks darker than the other areas (which will be referred to herein as a "domain line DL4") parallel to this edge portion EG4.

If the horizontal direction on a display screen (i.e., the three o'clock direction) has an azimuthal angle of zero degrees, the tilt directions t1, t2, t3 and t4 are an approximately 225 degree direction (liquid crystal domain A), an approximately 315 degree direction (liquid crystal domain B), an approximately 45 degree direction (liquid crystal domain C) and an approximately 135 degree direction (liquid crystal domain D), respectively. The liquid crystal domains A, B, C and D are arranged such that the tilt directions of any two adjacent ones of the liquid crystal domains define an angle of approximately 90 degrees between them. The angle defined by any of the tilt directions t1, t2, t3 and t4 of the liquid crystal domains A, B, C and D with respect to an associated one of the azimuth angle components e1, e2, e3 and e4 of the anchoring forces produced by the oblique electric fields at the nearby edge portions EG1, EG2, EG3 and EG4 is approximately 135 degrees.

The dark areas (i.e., the domain lines DL1 through DL4) that are produced parallel to the edge portions EG1, EG2, EG3 and EG4, respectively, within the pixel region 10 deteriorate the viewing angle characteristic as will be described later. Thus, by providing opaque portions that can selectively shield at least respective parts of these edge portions EG1 through EG4 from incoming light, the deterioration of the viewing angle characteristic can be minimized.

As used herein, "to shield an edge portion from incoming light" means shielding not only the edge portion EG1, EG2, EG3 or EG4 but also its associated dark area (i.e., the domain line DL1, DL2, DL3 or DL4) produced near the edge portion in the pixel region from incoming light. The location of each domain line (i.e., the distance from its associated edge portion of the pixel electrode) is changeable with the dimensions of the pixel electrode, for example. Typically, however, the opaque portion may be arranged so as to shield a range that reaches approximately 10 μm to 20 μm from any edge portion of the pixel electrode from incoming light. Also, "an opaque portion for selectively shielding an area from incoming light" means that the opaque portion is provided to shield only that area selectively from incoming light. Nevertheless, there is no need to isolate such an opaque portion for selectively shielding an area from incoming light from the other opaque portions. To minimize the deterioration in viewing angle characteristic, the opaque portions are preferably arranged so as to shield all of the domain lines from incoming light. However, the presence of the opaque portions would decrease the optical efficiency (represented by the effective aperture ratio of a pixel). If an opaque portion that shields at least a part of an edge portion (including a domain line produced around there) from incoming light is provided, then the deterioration in viewing angle characteristic can be lightened at least to that degree. That is why the portions to shield from incoming light may be determined so as to strike an adequate balance between the required performance of the LCD and the optical efficiency to achieve.

Typically, an opaque portion is arranged so as to shield an edge portion and a domain line, which is produced near the edge portion in the pixel region, from incoming light. However, if the pixel aperture ratio should be given a higher priority than the viewing angle characteristic to strike a proper balance between them, only a part or all of the domain line may be shielded from incoming light without shielding the edge portion in order to reduce the area of the opaque portion, in most of the preferred embodiments to be described below, the edge portion and all of the domain line are supposed to be shielded from incoming light. However, in any of those preferred embodiments, the viewing angle characteristic can be improved by providing an opaque portion that selectively shields at least a portion of the domain line.

A method of dividing a pixel region into these four liquid crystal domains A through D (i.e., the arrangement of the liquid crystal domains in the pixel region) is not limited to the example illustrated in FIG. 1. Alternative alignment division methods (or alternative arrangements of liquid crystal domains) will be described with reference to FIGS. 2 through 5.

Portion (a) of FIG. 2 shows a method of dividing the pixel region 10 shown in FIG. 1. More specifically, the pretilt directions PA1 and PA2 defined by the alignment film of a TFT substrate (i.e., the lower substrate), the pretilt directions PB1 and PB2 defined by the alignment film of a color filter (CF) substrate (i.e., the upper substrate), the tilt directions defined responsive to the application of a voltage to the liquid crystal layer, and areas that look dark due to misalignment (i.e., domain lines DL1 through DL4) are shown in portion (a) of FIG. 2. Those areas are not so-called "disclination lines". These drawings schematically indicate the orientation directions of liquid crystal molecules as viewed by the viewer and show that the liquid crystal molecules are tilted such that the elliptical end of each cylindrical liquid crystal molecule points toward the viewer.

By conducting an alignment treatment so as to achieve the alignment state shown in portion (a) of FIG. 2, the pixel region 10 can be defined. Specifically, the alignment treatment is conducted so as to divide the pixel region close to the TFT substrate into two and to define the pretilt directions PA1 and PA2 that are antiparallel to the vertical alignment film. In this preferred embodiment, an optical alignment treatment is carried out by irradiating the liquid crystal layer with an ultraviolet ray obliquely that has come from the direction pointed by the arrows. The alignment treatment is also conducted so as to divide the pixel region close to the CF substrate into two and to define the pretilt directions PB1 and PB2 that are antiparallel to the vertical alignment film. By bonding these substrates together, a multi-domain structure can be defined in the pixel region 10. In the optical alignment treatment, the light does not have to come from the directions indicated above. Alternatively, the pixel region on the CF substrate may be irradiated with a light ray that has come from a direction that is tilted with respect to the vertical direction (i.e., the column direction) and the pixel region on the TFT substrate may be irradiated with a light ray that has come from a direction that is tilted with respect to the horizontal direction (i.e., the row direction).

As already described with reference to FIG. 1, the domain lines DL1, DL2, DL3 and DL4 are produced in the liquid crystal domains A, B, C and D parallel to the edge portions EG1, EG2, EG3 and EG4, respectively. The sum of the lengths of these four domain lines DL1 through DL4 will be an approximately half of the overall length of the four edges of the pixel electrode. The edge portions EG1 and EG3 (with the domain lines DL1 and DL3) are parallel to the vertical direction, while the edge portions EG2 and EG4 (with the domain lines DL2 and DL4) are parallel to the horizontal direction.

As shown in portion (a) of FIG. 2, a dark line is also observed in the boundary area of each of the liquid crystal domains A through D, which is adjacent to another one of the liquid crystal domains A through D, as indicated by the dashed line CL1. As will be described later, the crossed dark lines formed around the center of the pixel region are not always misalignment and do not have to be shielded on purpose. However, if an opaque member needs to be arranged within the pixel region, the opaque member is preferably arranged to hide these dark lines because the effective aperture ratio of the pixel (i.e., the optical efficiency) can be increased in that case.

Alternatively, by bonding together the TFT and CF substrates that have been subjected to the alignment treatment as shown in portion (b) of FIG. 2, a multi-domain structure can be defined for a pixel region 20. This pixel region 20 also includes four liquid crystal domains A, B, C and D. The tilt directions of the liquid crystal domains A through D are the same as those of the liquid crystal domains of the pixel region 10 shown in FIG. 1.

The domain lines DL1, DL2, DL3 and DL4 are produced in the liquid crystal domains A, B, C and D parallel to the edge portions EG1, EG2, EG3 and EG4, respectively. The sum of the lengths of these four domain lines DL1 through DL4 will be an approximately half of the overall length of the four edges of the pixel electrode. The edge portions EG1 and EG3 (with the domain lines DL1 and DL3) are parallel to the horizontal direction, while the edge portions EG2 and EG4 (with the domain lines DL2 and DL4) are parallel to the vertical direction. As shown in portion (b) of FIG. 2, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Alternatively, by bonding together the TFT and CF substrates that have been subjected to the alignment treatment as shown in portion (a) of FIG. 3, a multi-domain structure can be defined for a pixel region 30. This pixel region 30 also includes four liquid crystal domains A, B, C and D. The tilt directions of the liquid crystal domains A through D are the same as those of the liquid crystal domains of the pixel region 10 shown in FIG. 1.

The tilt directions t1 and t3 of the liquid crystal domains A and C do not point toward any edge portions of the pixel electrode, and therefore, no domain lines are produced in these liquid crystal domains. On the other hand, the tilt directions t2 and t4 of the liquid crystal domains B and D point toward their associated edge portions of the pixel electrode and define an angle greater than 90 degrees with respect to azimuthal directions that are perpendicular to the edge portions and that point toward the inside of the pixel electrode. As a result, domain lines DL2 and DL4 are produced. Each of the domain lines DL2 and DL4 includes a portion (H) that is parallel to the horizontal direction and a portion (V) that is parallel to the vertical direction. That is to say, each of the tilt directions t2 and t4 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. As shown in portion (a) of FIG. 3, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Alternatively, by bonding together the TFT and CF substrates that have been subjected to the alignment treatment as shown in portion (b) of FIG. 3, a multi-domain structure can be defined for a pixel region 40. This pixel region 40 also includes four liquid crystal domains A, B, C and D. The tilt directions of the liquid crystal domains A through D are the same as those of the liquid crystal domains of the pixel region 10 shown in FIG. 1.

The tilt directions t1 and t3 of the liquid crystal domains A and C point toward their associated edge portions of the pixel electrode and define an angle greater than 90 degrees with respect to azimuthal directions that are perpendicular to the edge portions and that point toward the inside of the pixel electrode. As a result, domain lines DL1 and DL3 are produced. Each of the domain lines DL1 and DL3 includes a portion DL1(H) or DL3(H) that is parallel to the horizontal direction and a portion DL1(V) or DL3(V) that is parallel to the vertical direction. That is to say, each of the tilt directions t1 and t3 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. On the other hand, the tilt directions t2 and t4 of the liquid crystal domains B and D do not point toward any edge portions of the pixel electrode, and therefore, no domain lines are produced in these liquid crystal domains. As shown in portion (b) of FIG. 3, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Alternatively, by bonding together the TFT and CF substrates that have been subjected to the alignment treatment as shown in portion (a) of FIG. 4, a multi-domain structure can be defined for a pixel region 50. This pixel region 50 also includes four liquid crystal domains A, B, C and D. The tilt directions of the liquid crystal domains A through D are the same as those of the liquid crystal domains of the pixel region 10 shown in FIG. 1.

The tilt directions t1, t2, t3 and t4 of all of these liquid crystal domains A, B, C and D point toward their associated edge portions of the pixel electrode and define an angle greater than 90 degrees with respect to azimuthal directions that are perpendicular to the edge portions and that point toward the inside of the pixel electrode. As a result, domain lines DL1, DL2, DL3 and DL4 are produced. Each of the domain lines DL1 through DL4 includes a portion DL1(H), DL2(H), DL3(H) or DL4(H) that is parallel to the horizontal direction and a portion DL1(V), DL2(V), DL3(V) or DL4(V) that is parallel to the vertical direction. That is to say, each of the tilt directions t1 through t4 defines an angle greater than 90 degrees with respect to both an azimuthal direction that is perpendicular to an edge portion of the horizontal edge and that points toward the inside of the pixel electrode and an azimuthal direction that is perpendicular to an edge portion of the vertical edge and that points toward the inside of the pixel electrode. Consequently, domain lines are produced in both of the two directions. As shown in portion (a) of FIG. 4, a dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

Alternatively, by bonding together the TFT and CF substrates that have been subjected to the alignment treatment as shown in portion (b) of FIG. 4, a multi-domain structure can be defined for a pixel region 60. This pixel region 60 also includes four liquid crystal domains A, B, C and D. The tilt directions of the liquid crystal domains A through D are the same as those of the liquid crystal domains of the pixel region 10 shown in FIG. 1.

None of the tilt directions t1, t2, t3 and t4 of the liquid crystal domains A through D point toward any edge portions of the pixel electrode, and therefore, no domain lines are produced at all in these liquid crystal domains. A dark line is also observed in the boundary area of each of the liquid crystal domains A through D, which is adjacent to another one of the liquid crystal domains A through D, as indicated by the dashed line CL1. These dark lines are produced in the shape of a cross around the center of the pixel region.

In each of the four-domain structures described above, four liquid crystal domains are arranged in two columns and two rows to define a matrix pattern. However, the present invention is in no way limited to that specific preferred embodiment. Alternatively, the four liquid crystal domains may be arranged in line in a predetermined direction as shown in FIGS. 5(a) and 5(b), in which the liquid crystal domains are arranged in line in the column direction.

The pixel region 70 shown in FIG. 5(a) also includes four liquid crystal domains A, B, C and D. The tilt directions of the liquid crystal domains A through D are the same as those of the liquid crystal domains of the pixel region 10 shown in FIG. 1. The tilt directions t1, t2, t3 and t4 of all of these liquid crystal domains A, B, C and D point toward their associated edge portions of the pixel electrode and define an angle greater than 90 degrees with respect to azimuthal directions that are perpendicular to the edge portions and that point toward the inside of the pixel electrode. As a result, domain lines DL1, DL2, DL3 and DL4 are produced. All of these domain lines DL1 through DL4 are parallel to the vertical direction (i.e., the direction in which the liquid crystal domains are arranged). A dark line is also observed in the boundary area of each of the liquid crystal domains A through D, which is adjacent to another one of the liquid crystal domains A through D. These dark lines are produced horizontally (i.e., perpendicularly to the direction in which the liquid crystal domains are arranged) around the center of the pixel region.

On the other hand, in the pixel region 80 shown in FIG. 5(b), the tilt directions of the four liquid crystal domains A', B', C' and D' are 90 degrees, 180 degrees, 0 degrees and 270 degrees, respectively, as shown in that drawing. The domain lines DL1' and DL4' of the liquid crystal domains A' and D' are parallel to the horizontal direction. And the domain lines DL2' and DL3' are parallel to the vertical direction A dark line is also observed in the boundary area of each of the liquid crystal domains A' through D', which is adjacent to another one of the liquid crystal domains A' through D'. These dark lines are produced horizontally (i.e., perpendicularly to the direction in which the liquid crystal domains are arranged) around the center of the pixel region. If the tilt directions are defined in this manner, the polarizers are preferably arranged such that their transmission axes define angles of ±45 degrees with respect to the horizontal direction.

Next, it will be described with reference to FIGS. 6 through 9 how domain lines are produced near the edge portions of a pixel electrode and how dark lines are produced (in the shape of a cross as shown in FIG. 2, for example) around the center of the pixel region. FIGS. 6 through 9 are cross-sectional views of a pixel region of a liquid crystal display device, showing the equipotential curve of an electric field created in the liquid crystal layer 3, the orientation directions of liquid crystal molecules 3a in the layer, and the relative (front) transmittance thereof, which were figured out by simulations.

This liquid crystal display device includes a TFT substrate 1 including a transparent substrate (e.g., a glass substrate) 1a and a pixel electrode 11 on the transparent substrate 1a, a CF substrate 2 including a transparent substrate (e.g., a glass substrate) 2a and a counter electrode 12 on the transparent substrate 2a, and a vertical alignment liquid crystal layer 3 interposed between the TFT and CF substrates 1 and 2. A vertical alignment film (not shown) is provided on each of the TFT and CF substrates 1 and 2 so as to contact with the liquid crystal layer 3. The liquid crystal layer is subjected to an alignment treatment so as to have the pretilt directions controlled as indicated by the arrows, arrowheads and arrow tails in FIGS. 6 to 9.

First, referring to FIG. 6, illustrated ins a cross-sectional view of the left half of the pixel region 20 shown in portion (b) of FIG. 2, including an edge portion of the liquid crystal domain D with the domain line DL4, as viewed on a plane defined by an azimuth angle of zero degrees. It can be seen that at an edge portion of the pixel electrode 11 shown in FIG. 6, liquid crystal molecules 3a (with a tilt angle of 135 degrees), located around the center of a plane of the liquid crystal domain and approximately at the middle of the thickness thereof, are gradually twisted toward the edge portion of the pixel electrode under the anchoring force (defined by an azimuthal direction of zero degrees) of an oblique electric field generated in the edge portion of the pixel electrode 11. In this example, the twist angle is 135 degrees, which is greater than 90 degrees. That is why due to a variation in retardation in this twisting region of the liquid crystal layer, the relative transmittance varies in a complicated manner as shown in FIG. 6, thereby producing a domain line in which the relative transmittance becomes local minimum within the pixel region (i.e., inside of the edge of the pixel electrode). That region with the local minimum transmittance as indicated by the dotted square in FIG. 6 corresponds to the domain line DL4 in the liquid crystal domain D shown in portion (b) of FIG. 2.

On the other hand, in another edge portion of the pixel electrode in which no domain line is produced as shown in FIG. 7, the twist angle of the liquid crystal molecules (i.e., the difference in tilt direction between the liquid crystal molecules located around the center of the liquid crystal domain and the liquid crystal molecules, of which the alignment is controlled by an oblique electric field that has been generated in the edge portion of the pixel electrode 11) is 90 degrees or less. And the relative transmittance decreases monotonically from the central portion of the pixel region toward the end thereof and reaches its local minimum outside of the pixel region (i.e., at the left end of FIG. 7), not inside of the pixel region. FIG. 7 is a cross-sectional view of the lower half of the pixel region 20 shown in portion (b) of FIG. 2, including another edge portion of the liquid crystal domain D without the domain line DL4, as viewed on a plane defined by an azimuth angle of 90 degrees.

Meanwhile, as shown in FIGS. 8 and 9, the liquid crystal molecules also have a twist angle of 90 degrees or less in the boundary area in which two liquid crystal domains are adjacent to each other within the pixel region. Thus, the relative transmittance also changes simply and reaches a local minimum value there. FIG. 8 is a cross-sectional view of the liquid crystal domains D and A shown in portion (b) of FIG. 2, including the boundary area between them, as viewed on a plane defined by an azimuth angle of zero degrees. FIG. 9 is a cross-sectional view of the liquid crystal domains B and A shown in portion (b) of FIG. 4, including the boundary area between them, as viewed on a plane defined by an azimuth angle of zero degrees.

FIG. 10 shows the distributions of transmission intensities in a situation where the pixel region 10 is viewed from the direction defined by an azimuth angle of 45 degrees. The four graphs of FIG. 10 show the distributions of transmission intensities on the four planes I, II, III and IV, respectively. Also, each of these graphs shows results in three viewing directions defined by polar angles of zero degrees (i.e., front direction), 45 degrees and 60 degrees, respectively.

It can be seen that in the domain lines appearing at the left end of Graph I, at the right end of Graph II, at the right end of Graph III, and at the left end of Graph IV, the behavior of the transmission intensity changes significantly according to the polar angle (particularly in Graph III). That is to say, the location with the minimum transmission intensity changes with the polar angle. For example, the transmission intensity in the front viewing direction (defined by a polar angle of zero degrees) is local minimum, whereas the transmission intensities at the polar angles of 45 and 60 degrees are local maximum. If the transmission intensity changes according to the polar angle in this manner, the viewing angle characteristic deteriorates. Among other things, the viewing angle dependence of γ characteristic deteriorates significantly to cause a phenomenon called "whitening".

By providing opaque portions that can selectively shield at least respective portions of the domain lines, produced in the edge portions of the pixel electrode, from incoming light, such deterioration in viewing angle characteristic can be reduced. Also, those domain lines are produced in the edge portions when the tilt directions of the liquid crystal molecules around the center of the liquid crystal layer are defined as described above with respect to the edges of the electrode.

That is why the domain lines may also be produced in a normal pixel region with no multi-domain structures. For that reason, to minimize the deterioration in viewing angle characteristic due to the production of domain lines in the edge portions of the pixel electrode, such opaque portions for selectively shielding at least respective portions of the domain lines are preferably provided, no matter whether the multi-domain structure should be formed or not.

The dark lines formed around the center of the pixel region (e.g., crossed lines CL1) are not always misalignment and do not have to be shielded on purpose. However, if an opaque member needs to be arranged within the pixel region, the opaque member is preferably arranged to hide these dark lines because the effective aperture ratio of the pixel (i.e., the optical efficiency) can be increased in that case.

Hereinafter, preferred embodiments of opaque portions will be described specifically. Each of the opaque portions to be described below may be used either by itself or in combination with any other opaque portion.

A TFT LCD usually includes an opaque member. For example, a TFT substrate includes a gate bus line, a source bus line, a drain extension line and a storage capacitor line (which will be referred to herein as a "CS bus line"). Also, a CF substrate includes a black matrix to shield the surrounding areas of color filters that are arranged so as to overlap with pixel regions. The opaque portions for selectively shielding at least portions of the domain lines may be defined by using these opaque members. Furthermore, to minimize the decrease in optical efficiency caused by the opaque member arranged within the pixel region, the opaque member is preferably arranged so as to hide the dark area produced between adjacent liquid crystal domains.

Hereinafter, an exemplary pixel structure for a liquid crystal display device according to the present invention will be described. In the drawings, any pair of components shown in multiple drawings and having substantially the same function is identified by the same reference numeral. And once a component has been described, the description of its counterpart will be omitted herein to avoid redundancies. Also, in a number of pixels that are arranged in columns and rows so as to form a matrix pattern, the structure of a pixel located at an intersection between an $m^{th}$ row and an $n^{th}$ column will be described. It should be noted that a row corresponds to an arrangement of pixels along a gate bus line (or scan line), while a column corresponds to an arrangement of pixels along a source bus line (or signal line). Typically, rows are defined in the horizontal direction on the display screen, while columns in the vertical direction on the display screen.

The opaque portions may be defined by using at least portions of the source bus line 114, the CS bus line 113, the drain extension line 117 and the gate bus line 112 as shown in FIG. 11, for example. In the following description, an $m^{th}$ gate bus line 112 will be referred to herein as a "gate bus line 112($m$)" and an $n^{th}$ source bus line 114 will be referred to herein as a "gate bus line 114($n$)".

The pixel region shown in FIG. 11 illustrates a subpixel with the multipixel structure disclosed in Japanese Patent Application Laid-Open Publication No. 2004-62146. The following description will be focused on the structure of the upper one of the two subpixel regions that has the subpixel electrode 111a.

The sub-pixel electrode 111a is connected to the drain electrode 116D of the TFT 116a and is arranged so as to partially overlap with the source bus line 114, the gate bus line 112 and the CS bus line 113 with an interlayer dielectric film (not shown) of resin interposed between them. Also, at the center of the sub-pixel electrode 111a, a storage capacitor CS is formed by an extended portion 117E of the drain extension line 117, an extended portion 113E of the CS bus line 113 and an insulating layer (e.g., a gate insulating layer) between them.

The multipixel structure shown in FIG. 11 has the following features.

The conventional pixel electrode is divided into two sub-pixel electrodes, which are connected to the same source bus line 114 by way of their associated TFTs 116a and 116b (i.e., two TFTs in total). The ON and OFF states of the two TFTs 116a and 116b are controlled through the common gate bus line 112. The two TFTs 116a and 116b share a semiconductor layer 116m, a source electrode 116S, and a gate electrode (gate bus line 112) in common. And the respective drain electrodes 116D of the two TFTs are electrically connected to their associated subpixel electrodes. The drain electrode 116D of the TFT 116a and the subpixel electrode 111a are electrically connected together by connecting the drain extension line 117, extending from the drain electrode 116D, to the subpixel electrode 111a in a contact hole 119 that has been cut through an interlayer dielectric film (which is not shown in FIG. 11 but is identified by the reference numeral 118a in FIG. 15).

Each subpixel electrode (which is the upper subpixel electrode 111a in FIG. 11 with the lower subpixel electrode not shown there), the liquid crystal layer, and a counter electrode (common electrode) that faces these electrodes with the liquid crystal layer interposed between them form a liquid crystal capacitor. Storage capacitors CS are formed electrically in parallel with the liquid crystal capacitors associated with the respective subpixel regions. As for the upper subpixel, one of the two electrodes that form the storage capacitor (i.e., the storage capacitor electrode) is defined by the extended portion 117E of the drain extension line 117 that is connected to the drain 116D of the same TFT 116a as the subpixel electrode 111a, while the other electrode (i.e., the storage capacitor counter electrode) is defined by the extended portion 113E of the CS bus line 113 provided for the upper subpixel. Likewise, as for the lower subpixel, one of the two electrodes that form the storage capacitor (i.e., the storage capacitor electrode) is defined by the extended portion (not shown) of the drain extension line (not shown) that is connected to the drain (not shown) of the same TFT 116b as the lower subpixel electrode (not shown), while the other electrode (i.e., the storage capacitor counter electrode) is defined by the extended portion (not shown) of the CS bus line (not shown) provided for the lower subpixel.

The CS bus lines 113 are provided electrically independently of each other for the two subpixels. For example, if the storage capacitor counter voltage supplied to the storage capacitor belonging to one subpixel through the CS bus line 113 rises after the TFT 116a has been turned OFF, the storage capacitor counter voltage supplied to the storage capacitor belonging to the other subpixel through the CS bus line 113 falls after the TFT 116b has been turned OFF. If (the magnitudes and/or the directions of) the storage capacitor counter voltages of the storage capacitors belonging to the respective subpixels are changed differently after their associated TFTs have been turned OFF, different effective voltages will be applied to the respective liquid crystal layers of the two subpixels. As a result, the two subpixels can present two different luminances (one of which is relatively high and the other of which is relatively low) with respect to the display signal voltage supplied through the source bus line 114. Consequently, the viewing angle dependence of the γ characteristic can be reduced.

The sub-pixel region shown in FIG. 11 has a multi-domain structure similar to that of the pixel region 10 described above. That is to say, domain lines are produced near the edge portions EG1, EG2, EG3 and EG4 of the sub-pixel electrode and crossed dark lines are produced at the center of the sub-pixel region.

The opaque portions for selectively shielding at least portions of the domain lines produced near the edge portions EG1 and EG3 may be formed by bending the source bus line 114 in a direction that crosses its length direction (the vertical direction), i.e., toward the sub-pixel electrode. Optionally, the opaque portions may also be formed by locally increasing the width of the source bus line 114. However, the opaque portions are preferably formed by bending the source bus line 114 because the stray capacitance might increase if the source bus line had an increased width.

The domain line produced in the edge portion EG2 may be shielded by increasing the width of overlap between the edge portion of the sub-pixel electrode 111a and the gate bus line 112. The overlap width may be increased either by partially increasing the width of the sub-pixel electrode 111a or the gate bus line 112 (e.g., by providing the broadened portion 111E of the subpixel electrode 111a shown in FIG. 11) or by bending the gate bus line 112 in a direction that crosses its length direction (i.e., the horizontal direction).

The domain line produced in the edge portion EG4 may be shielded by increasing the width of overlap between the edge portion of the sub-pixel electrode 111a and the CS bus line 113. The overlap width may be increased either by partially increasing the width of the sub-pixel electrode 111a or the CS bus line 113 (e.g., by providing the broadened portion 113A of the CS bus line 113 shown in FIG. 11) or by bending the CS bus line 113 in a direction that crosses its length direction (i.e., the horizontal direction).

The opaque portions for selectively shielding at least portions of the dark areas produced in the boundary areas between the liquid crystal domains may be formed by respective extended portions 113e and 113E of the CS bus line 13 and the drain extension line 117 and its extended portion 117E. By using the storage capacitor CS in the pixel as an opaque portion in this manner, the extra decrease in optical efficiency can be minimized.

Alternatively, the CS bus line 113 may have not only the extended portions 113e and 113E for shielding the crossed dark lines at the center of the pixel region but also additional extended portions 113E1 and 113E2 for shielding the domain lines produced in the edge portions EG1 and EG2, respectively, as shown in FIG. 12.

If a multi-domain structure similar to that of the pixel region 30 shown in portion (a) of FIG. 3 is formed for the sub-pixel regions then the arrangement shown in FIG. 13 may be adopted, for example.

Specifically, the domain line (DL4(H) shown in portion (a) of FIG. 3) produced in the horizontal part of the edge portion EG4 may be shielded by increasing the width of overlap between the CS bus line 13 and the sub-pixel electrode 111a. The width of overlap can be increased by partially increasing the width of the sub-pixel electrode 111a such that an extended portion 111E1 is formed. On the other hand, the domain line (DL2(H) shown in portion (a) of FIG. 3) produced in the horizontal part of the edge portion EG2 may be shielded by increasing the width of overlap between the gate bus line 112 and the sub-pixel electrode 111a. The width of overlap can be increased by partially increasing the width of the sub-pixel electrode 111a such that an extended portion 111E2 is formed. The vertical parts of the edge portions EG2 and EG4 (DL2(V) and DL4(V) shown in portion (a) of FIG.

3) may be shielded by the bent portions of the source bus line 114 as in the example described above.

If a multi-domain structure similar to that of the pixel region 10 is adopted, the opaque portions for shielding the dark areas produced in the boundary areas between the liquid crystal domains may be defined by the extended portions 117E and 117E' of the drain extension line 117 as shown in FIG. 14. The extended portion 117E faces the CS bus line 113 to form a storage capacitor.

FIG. 15 is a cross-sectional view of the structure shown in FIG. 14 as viewed on the plane 15A-15A' shown in FIG. 14. As shown in FIG. 15, the drain extension line 117 and the gate bus line 112 interpose a gate insulating film 115 between them. Thus, leakage is less likely to be produced between the drain extension line 117 and the gate bus line 112 because these belong to two separate layers. A normal pixel with no multipixel structure is illustrated in FIG. 14. When this arrangement is applied to a multipixel structure, even if a CS bus line is arranged in place of the gate bus line 112 in the upper part of FIG. 14, the opaque portion may also be formed to hide the central cross lines by the extended portions 117E and 117E' of the drain extension line 117 as shown in FIG. 14, too. The CS bus line 113 is made of the same conductive layer (which is typically a metal layer) as the gate bus line 112. That is why leakage is less likely to be produced between the drain extension line 117 and the CS bus line 113. That is to say, the vertical part of the opaque portion to form the cross and the horizontal part of the opaque portion to shield the horizontal edge portion are preferably made of two different layers. By adopting such an arrangement, the leakage failures can be reduced compared to the configuration disclosed in FIG. 60 of Patent Document No. 1.

In the pixel structure shown in FIG. 15, a relatively thick interlayer dielectric film 118a of a photosensitive resin, for example, is interposed between the pixel electrode 111 and the source bus line 114. That is why even if the pixel electrode 111 (or the subpixel electrode 111a) and the source bus line 114 (and the gate bus line 112) are stacked one upon the other as shown in FIG. 14, the capacitance produced between the pixel electrode 111 and the source bus line 114 can be reduced sufficiently. Consequently, the voltage at the pixel electrode 111 never varies due to the voltage (i.e., signal voltage) on the source bus line 114 by way of the capacitance. That is to say, by adopting the pixel structure shown in FIG. 15 in which the pixel electrode 111 and the source bus line 114 are stacked one upon the other, the aperture ratio of the pixel can be increased.

Alternatively, the domain lines produced in the edge portions and the crossed dark lines produced around the center of the pixel region may be shielded by the extended portion 113e of the CS bus line 113 as shown in FIGS. 16 and 17. In the arrangement illustrated in FIGS. 16 and 17, a relatively thin interlayer dielectric film 118b of an inorganic material such as $SiN_x$, for example, is provided between the pixel electrode 111 and the source bus line 114. In this arrangement, to prevent the voltage at the pixel electrode 111 from being affected by the voltage (i.e., signal voltage) on the source bus line 114, the pixel electrode 111 and the bus lines are arranged so as not to overlap each other. This arrangement does not contribute to increasing the aperture ratio of a pixel but can simply the manufacturing process because a relatively thin inorganic insulating film can be used as the interlayer dielectric film 118b.

As another alternative, the domain lines produced in the edge portions and the crossed dark lines produced around the center of the pixel region may also be shielded by extending the drain extension line 117 as shown in FIG. 18. Since the drain extension line 117 belongs to a different layer from that of the gate bus line 112 and the CS bus line 113 as described above, leakage failures are less likely to occur between them. A subpixel region with a multipixel structure is illustrated in FIG. 18. However, this structure is equally applicable for use in a normal pixel region, too.

In each of the examples described above, the opaque portions are defined by using the opaque members arranged on the TFT substrate. If necessary, however, part or all of the opaque portions may be located on the CF substrate. For example, opaque portions with relatively broad widths (e.g., the opaque portions for shielding the domain lines produced in the edge portions parallel to the vertical direction and the opaque portion for shielding the crossed dark lines produced around the center of the pixel region) may be defined by the black matrix layer 132 on the CF substrate as shown in FIG. 19. In this example, the horizontally extending portion of the crossed dark lines around the center of the pixel is supposed to be shielded entirely by the extended portion 132E of the black matrix layer 132. Alternatively, part of that portion may be shielded by the black matrix layer 132 and the other part may be shielded by the drain extension line 117. Still alternatively, any of the shielding structures and this arrangement may be combined appropriately.

Also, at least the substrate with the opaque portions is preferably irradiated with light (typically an ultraviolet ray) for the purpose of optical alignment treatment. The opaque portions described above are provided in areas where misalignment may arise in the multi-domain structure. That is why if the opaque portions were provided for the other substrate to face the substrate that has been irradiated with light to define the multi-domain structure, then an alignment error should be considered when those substrates are bonded together and the size of the opaque portions should be increased excessively, which is not beneficial. Also, the substrate is preferably irradiated with light that has come from a direction in which the light is not affected by the unevenness on the surface of the substrate. For example, if the CF substrate is irradiated with light, the light preferably comes from the column direction. Then, no shadow areas would be produced by the black matrix that is arranged between the rows.

Intersection

The present inventors discovered that at the intersections OD between the domain lines produced in the edge portions and the boundary areas between adjacent liquid crystal domains, the liquid crystal molecules had particularly inconsistent orientations and noticeably low response speeds as shown in FIG. 20. For that reason, in an application that pays much attention to moving picture display performance, those areas surrounding the intersections OD where the liquid crystal molecules have inconsistent orientations are preferably shielded.

Those intersections OD are preferably shielded by providing extensions TR1, TR2, TR3 and TR4 that protrude out of the opaque portions for shielding the domain lines produced in the edge portions and the opaque portions for shielding the boundary area between adjacent liquid crystal domains as shown in FIG. 21. Specifically, the extensions TR1 and TR3 are extended from the CS bus line extended portion 113E, the extension TR2 is extended from the gate bus line 112, and the extension TR4 is extended from the CS bus line 113. If necessary, it is naturally possible to shield only the intersections OD selectively. The extensions TR1 through TR4 have an almost triangular shape. However, the extensions may have any other shape as long as the optical efficiency (or aperture ratio) does not decrease unnecessarily. In view of this consideration, the extensions preferably have such a triangular shape as shown in FIG. 21.

Partial Shielding

The liquid crystal display device of the preferred embodiment described above includes opaque portions for shielding edge portions with domain lines substantially entirely. However, the present invention is in no way limited to that specific preferred embodiment. To minimize the deterioration in viewing angle characteristic, the opaque portions are preferably arranged so as to shield the domain lines from incoming light entirely as described above. If the opaque portions were present, however, the optical efficiency (i.e., the effective aperture ratio of a pixel) would decrease. That is why the edge portions may be shielded partially to strike an adequate balance between the viewing angle characteristic and the optical efficiency.

Particularly if an arrangement in which the pixel electrode does not overlap with the source bus line as viewed perpendicularly to the substrate (see the cross-sectional view shown in FIG. 17, for example) is adopted, the pixel aperture ratio decreases. For that reason, to avoid a significant decrease in pixel aperture ratio, the opaque areas are preferably as small as possible. If a relatively thick interlayer dielectric film 118a of a photosensitive resin, for example, is interposed between the pixel electrode 111 and the source bus line 114 as shown in FIG. 15, the capacitance produced between the pixel electrode 111 (or the subpixel electrode 111a) and the source bus line 114 (and the gate bus line 112) can be reduced sufficiently even when the pixel electrode 111 (or the subpixel electrode 111a) overlaps with the source bus line 114 (and the gate bus line 112) as shown in FIGS. 14, 18, 19 and 21. That is why the voltage at the pixel electrode 111 (or the subpixel electrode 111a) is not affected by the voltage (i.e., signal voltage) on the source bus line 114 by way of this capacitance. Consequently, by overlapping the pixel electrode 111 (or the subpixel electrode 111a) and the source bus line 114 (and the gate bus line 112) each other, the pixel aperture ratio can be increased.

On the other hand, if an arrangement in which the pixel electrode 111 does not overlap with the source bus line 114 (and the gate bus line 112) is adopted as shown in the cross-sectional view of FIG. 17, then a relatively thin inorganic insulating film of $SiN_x$, for example, may be used as the interlayer dielectric film 118b. As a result, the manufacturing process can be simplified, which is advantageous. However, if such an arrangement in which the pixel electrode 111 does not overlap with the source bus line 114 is adopted, the pixel aperture ratio will decrease. For that reason, to achieve a sufficient display luminance, the opaque portions are preferably as small as possible.

To increase the uniformity of the viewing angle characteristic, the areas of those four liquid crystal domains in the pixel region are preferably equalized with each other as described above. Also, if the multipixel structure described above is adopted, the areas of four liquid crystal domains included in each subpixel region are preferably equalized with each other as shown in FIGS. 11 to 14 and FIGS. 16, 18, 19 and 21.

Hereinafter, examples of preferred multipixel structures will be described with reference to FIGS. 22 through 25.

In the pixel structure illustrated in FIG. 19 (which shows only one of its subpixels), the areas of the four liquid crystal domains thereof are approximately equal to each other. However, a significantly large area is shielded by the CS bus line 113 and the optical efficiency (which is represented by the aperture ratio, or the ratio of the area contributing to the display operation) achieved will be low. Thus, an example of a pixel structure that can substantially equalize the areas of the four liquid crystal domains with each other will be described.

FIG. 22 is a schematic representation illustrating yet another example of a pixel structure for a liquid crystal display device according to the present invention. FIG. 23 is a schematic representation illustrating yet another example of a pixel structure for a liquid crystal display device according to the present invention. FIG. 24 is a schematic cross-sectional view of the structure as viewed on the plane 24A-24A' shown in FIG. 23 and illustrates a cross section of a contact portion. And FIG. 25 is a schematic representation illustrating yet another example of a pixel structure for a liquid crystal display device according to the present invention. It should be noted that the respective contact portions of the pixel structures shown in FIGS. 22 and 25 have the same cross-sectional structure as the one shown in FIG. 24.

By narrowing the width of a portion of the CS bus line 113 that does not contribute to forming a storage capacitor (in other words, by providing a CS bus line extended portion 113E with the width of the CS bus line 113 partially expanded where a storage capacitor needs to be formed) as shown in FIG. 22, the aperture ratio can be increased. If the pixel structure shown in FIG. 22 is adopted, however, it becomes difficult to equalize the areas of the four liquid crystal domains with each other.

Also, the storage capacitor shown in FIG. 22 has the same cross-sectional structure as the one shown in FIG. 24. Specifically, the storage capacitor is made up of a CS bus line extended portion 113E functioning as a storage capacitor counter electrode, a gate insulating film 115, semiconductor layers (i.e., a stack of an i-layer 116m and an $n^+$-layer 116n), and the extended portion 117E (functioning as a storage capacitor electrode) of the drain extension line 117, which have been stacked one upon the other in this order on the glass substrate. And inside a contact hole that has been cut through a passivation film 118c and an interlayer dielectric film 118d deposited thereon, a contact portion 119 is provided between the drain extension line 117 and the subpixel electrode 111a. In this case, the semiconductor layers (i.e., the i-layer 116m and the $n^+$-layer 116n) are made of the same semiconductors as the TFTs 116a and 116b and have been patterned in the same process step as the counterparts of the TFTs 116a and 116b. In the example illustrated in FIG. 22, the i-layer 116m is illustrated as one of the semiconductor layers that form the TFTs 116a and 116b. However, the $n^+$-layer 116n is naturally present in source/drain regions to contact with the source and drain electrodes 116S and 116D, respectively.

By adopting such a structure in which the semiconductor layers 116m and 116n are sandwiched between the storage capacitor counter electrode (i.e., the CS bus line extended portion 113E) and the storage capacitor electrode (i.e., the drain extension line extended portion 117E), the depth of the contact hole decreases by the combined thickness of those two semiconductor layers as can be seen from FIG. 24. As a result, defects that would be caused when the subpixel electrode (of a transparent conductor layer of ITO, for example) 111a is disconnected by a stepped portion will occur much less frequently.

Nevertheless, if the structure shown in FIG. 22 is adopted, then the two storage capacitors of two subpixels belonging to two vertically adjacent pixels (i.e., two pixels that are adjacent to each other along the source bus line 114), more specifically, the storage capacitor of the lower subpixel in the upper pixel and that of the upper subpixel in the lower pixel, will be located closer to each other. That is why if the semiconductor layers could not be patterned as intended to short-circuit the n⁺-layer 116n, a point defect would be produced in a normally black mode LCD.

To avoid such a problem, the extended portion 113E of the storage capacitor line 113 preferably forms at least a part of the central opaque portion that selectively shields at least a portion of a boundary area, where each of the four liquid crystal domains is adjacent to another one of those four liquid crystal domains, from incoming light as in the pixel structure shown in FIG. 23. And the contact hole, which has been cut through an insulating layer including the contact portion 119 between the drain extension line 117 and the subpixel electrode 111a, is preferably located in a part of the central opaque portion closer to the liquid crystal layer. More specifically, the respective extended portions 113E and 117E of the storage capacitor line 113 and the drain extension line 117 have at least two rectangular portions that overlap with each other and that run in mutually different directions. These rectangular portions form not only the storage capacitor but also the central opaque portion as well.

Particularly if the central opaque portion includes at least two rectangular portions that run in mutually different directions as in the illustrated example, then the contact hole (and the contact portion 119) is preferably located where the rectangular portions intersect with each other. Also, the rectangular portions of the respective extended portions 113E and 117E of the storage capacitor line 113 and the drain extension line 117 are preferably arranged such that the contact hole is located at the center of the cross boundary area that is formed by the four liquid crystal domains, which are arranged in two columns and two rows so as to define a matrix pattern. By arranging the area where the alignment of liquid crystal molecules could be disturbed by the level differences of the contact hole at the center of the cross boundary area, it is possible to prevent the area that would not have the desired alignment state from expanding. In addition, as the intersection portion of the central opaque portion also cuts off the incoming light effectively, the deterioration in display quality can be reduced.

By adopting the arrangement shown in FIG. 23, the contact holes provided for the storage capacitors of two subpixels belonging to two different pixels that are adjacent to each other in the column direction can have an increased interval between them as can be seen easily when compared to FIG. 22. That is why even if a structure that has semiconductor layers 116m and 116n left in the storage capacitor is adopted, it is possible to prevent the n⁺-layer 116n of these semiconductor layers from causing a short circuit. In addition, it is rather easy to equalize the areas of the four liquid crystal domains with each other.

Optionally, to increase the aperture ratio, the pixel structure shown in FIG. 25 may also be adopted. In the pixel illustrated in FIG. 25, the respective extended portions 113E and 117E of the storage capacitor line 113 and the drain extension line 117 have only rectangular portions that overlap with each other and that run in the column direction, the central opaque portion has a rectangular portion running in the column direction, and the contact hole is located in a part of the rectangular portion running in the column direction closer to the liquid crystal layer. That is to say, this structure does not have the rectangular portion running in the row direction as shown in FIG. 23, thus achieving a higher aperture ratio accordingly. It should be noted that the storage capacitor has a smaller area than the counterpart of the pixel shown in FIG. 23. Even when the arrangement shown in FIG. 25 is adopted, the contact hole is also preferably located at the center of a cross boundary area formed by four liquid crystal domains that are arranged in two columns and two rows so as to define a matrix pattern.

INDUSTRIAL APPLICABILITY

A liquid crystal display device according to the present invention can be used effectively as a TV monitor or in any other application that requires high display quality.

The invention claimed is:

1. A liquid crystal display device comprising:
a vertical alignment liquid crystal layer;
a first substrate and a second substrate, which face each other with the liquid crystal layer interposed between them;
a first electrode, which is arranged on the first substrate so as to face the liquid crystal layer;
a second electrode, which is arranged on the second substrate so as to face the liquid crystal layer;
at least one alignment film, which is arranged in contact with the liquid crystal layer,
wherein a pixel region includes first, second, third and fourth liquid crystal domains in which liquid crystal molecules are tilted in first, second, third and fourth directions, respectively, around the center of a plane, and approximately at the middle of the thickness, of the liquid crystal layer in response to a voltage applied between the first and second electrodes, the first, second, third and fourth directions being defined such that an angle formed between any two of the four directions is approximately equal to an integral multiple of 90 degrees, the first, second, third and fourth liquid crystal domains being arranged in two columns and two rows so as to define a matrix pattern and to be adjacent to each other, and wherein the first substrate further includes a TFT, a gate bus line, a source bus line, a drain extension line, a storage capacitor line, and an insulating layer that is arranged between the drain extension line and the first electrode, and wherein an extended portion of the storage capacitor line defines at least a part of a central opaque portion that selectively shields at least a part of a boundary area, where each of the first, second, third and fourth liquid crystal domains contacts with another one of the liquid crystal domains, from incoming light, and wherein a contact hole has been cut through the insulating layer, where there is a contact portion between the drain extension line and the first electrode, and is located in a part of the central opaque portion that is closer to the liquid crystal layer, and
wherein the contact portion is located at the center of a cross boundary area, which is defined by the first, second, third and fourth liquid crystal domains that are arranged in two columns and two rows so as to define a matrix pattern.

2. The liquid crystal display device of claim 1, wherein the extended portion of the storage capacitor line and an extended portion of the drain extension line include at least two rectangular portions that overlap with each other and that run in mutually different directions, and wherein the central opaque portion includes at least two rectangular portions that run in mutually different directions, and wherein the contact hole is arranged where these two sets of rectangular portions intersect with each other and is located closer to the liquid crystal layer.

3. The liquid crystal display device of claim 1, wherein the extended portion of the storage capacitor line and an extended portion of the drive extension line include only rectangular portions that overlap with each other and that run in a column direction, and wherein the central opaque portion includes a rectangular portion that runs in the column direction, and wherein the contact hole is arranged in a part of the rectangular portions that run in the column direction so as to be located closer to the liquid crystal layer.

4. The liquid crystal display device of claim 1, wherein a gate insulating layer and a semiconductor layer are arranged on a part of the extended portion of the storage capacitor line, which defines the central opaque portion, so as to be located closer to the liquid crystal layer, and wherein the contact portion is located in a part of the semiconductor layer closer to the liquid crystal layer.

5. The liquid crystal display device of claim 1, wherein the pixel region includes two subpixel regions, in which mutually different voltages are applied to the liquid crystal layer with respect to a signal voltage that has been supplied from the source bus line by way of their associated TFTs, and wherein each of the two subpixel regions includes the first, second, third and fourth liquid crystal domains and the central opaque portion, and wherein the first electrode, the TFT, the drain electrode extension line and the storage capacitor line are provided for each of the two subpixel regions, and a storage capacitor (CS), including an extended portion of the drain electrode extension line, an extended portion of the storage capacitor line, and an insulating layer and a semiconductor layer located between these two extended portions, is also provided for each said subpixel region, and wherein the semiconductor layer of the storage capacitor is the same as the semiconductor layer of the TFT.

6. The liquid crystal display device of claim 1, wherein in the pixel region, the areas of the first, second, third and fourth liquid crystal domains are substantially equal to each other.

* * * * *